United States Patent
Park et al.

(10) Patent No.: US 8,933,871 B2
(45) Date of Patent: Jan. 13, 2015

(54) BACKLIGHT UNIT AND DISPLAY DEVICE

(75) Inventors: Sangtae Park, Seoul (KR); Sangjeon Kim, Seoul (KR); Sungwoo Kim, Seoul (KR); Soonhyung Kwon, Seoul (KR); Bupsung Jung, Seoul (KR); Seungchoon Bae, Seoul (KR); Hoyoung Seo, Seoul (KR); Seonghwan Ryu, Seoul (KR); Buwan Seo, Seoul (KR)

(73) Assignee: LG Electronics Inc., Seoul (KR)

(*) Notice: Subject to any disclaimer, the term of this patent is extended or adjusted under 35 U.S.C. 154(b) by 427 days.

(21) Appl. No.: 12/860,780

(22) Filed: Aug. 20, 2010

(65) Prior Publication Data

US 2011/0050558 A1 Mar. 3, 2011

Related U.S. Application Data

(60) Provisional application No. 61/237,587, filed on Aug. 27, 2009, provisional application No. 61/320,729, filed on Apr. 3, 2010, provisional application No. 61/322,427, filed on Apr. 9, 2010.

(30) Foreign Application Priority Data

| Aug. 27, 2009 | (KR) | 10-2009-0079700 |
|---|---|---|
| Aug. 27, 2009 | (KR) | 10-2009-0079710 |
| Aug. 28, 2009 | (KR) | 10-2009-0080249 |
| Nov. 24, 2009 | (KR) | 10-2009-0114225 |
| Nov. 24, 2009 | (KR) | 10-2009-0114226 |
| Nov. 24, 2009 | (KR) | 10-2009-0114227 |
| Mar. 24, 2010 | (KR) | 10-2010-0026210 |
| Apr. 12, 2010 | (KR) | 10-2010-0033236 |

(51) Int. Cl.
| G09G 3/36 | (2006.01) |
|---|---|
| G02F 1/1335 | (2006.01) |
| G09F 13/04 | (2006.01) |
| G09F 13/08 | (2006.01) |
| F21V 7/04 | (2006.01) |
| F21V 8/00 | (2006.01) |

(52) U.S. Cl.
CPC .... *G02F 1/133606* (2013.01); *G02F 1/133603* (2013.01); *G02B 6/0073* (2013.01); *G02F 1/133611* (2013.01); *G02F 2001/133607* (2013.01)
USPC ............... 345/102; 349/61; 349/64; 349/67; 362/97.2; 362/612

(58) Field of Classification Search
CPC ............... G02F 1/133603; G02F 1/133606; G02F 1/133611; G02F 2001/133607; G02B 6/0073; G02B 6/00
USPC .......... 345/102, 204–215; 349/61, 62, 64, 65, 349/67, 112; 362/97.1–97.3, 551, 600, 362/606–629
See application file for complete search history.

(56) References Cited

U.S. PATENT DOCUMENTS 7,106,517 B2 * 9/2006 Olczak .................... 359/599

(Continued)

FOREIGN PATENT DOCUMENTS

CN 1763604 A 4/2006

(Continued)

*Primary Examiner* — Dwayne Bost
*Assistant Examiner* — Larry Sternbane
(74) *Attorney, Agent, or Firm* — Birch, Stewart, Kolasch & Birch, LLP

(57) ABSTRACT

A backlight unit and a display device including the backlight unit are discussed. According to an embodiment, the invention provides a light generating device comprising: a first layer; a plurality of light source devices disposed on the first layer and configured to emit light, at least one of the light source devices including a light emitting diode for generating the light; a reflection layer disposed on the first layer and configured to reflect the light emitted from the light source devices; a second layer covering the light source devices and the reflection layer and configured to propagate the light reflected by the reflection layer, the second layer including a plurality of depressed portions, at least one of the depressed portions disposed between two adjacent light source devices among the plurality of light source devices; and at least one third layer disposed on the second layer and configured to diffuse the light propagated by the second layer.

18 Claims, 24 Drawing Sheets

(56) References Cited

U.S. PATENT DOCUMENTS

| | | | |
|---|---|---|---|
| 7,738,053 B2* | 6/2010 | Kubota | 349/65 |
| 2003/0202336 A1* | 10/2003 | Ostergard et al. | 362/24 |
| 2005/0265029 A1 | 12/2005 | Epstein et al. | |
| 2006/0087866 A1 | 4/2006 | Ng et al. | |
| 2006/0203513 A1* | 9/2006 | Aoki | 362/612 |
| 2009/0021469 A1* | 1/2009 | Yeo et al. | 345/102 |
| 2009/0091947 A1* | 4/2009 | Chou et al. | 362/612 |
| 2009/0129115 A1* | 5/2009 | Fine et al. | 362/606 |

FOREIGN PATENT DOCUMENTS

| | | | |
|---|---|---|---|
| CN | 1963566 A | 5/2007 | |
| EP | 1 640 756 A1 | 3/2006 | |
| EP | 1 959 277 A1 | 8/2008 | |
| JP | 200098105 * | 4/2000 | G02B 5/02 |
| JP | 2006-164625 A | 6/2006 | |
| JP | 2006-251075 A | 9/2006 | |
| JP | 2006-286217 A | 10/2006 | |
| JP | 2007-042320 A | 2/2007 | |

* cited by examiner (a)

(b)

(c)

(a)

(b)

(c)

BACKLIGHT UNIT AND DISPLAY DEVICE

This application claims the benefit of Korean Patent Application Nos. 10-2009-0079710 filed on Aug. 27, 2009, 10-2009-0079700 filed on Aug. 27, 2009, 10-2009-0080249 filed on Aug. 28, 2009, 10-2009-0114226 filed on Nov. 24, 2009, 10-2009-0114227 filed on Nov. 24, 2009, 10-2009-0114225 filed on Nov. 24, 2009, and 10-2010-0026210 filed on Mar. 24, 2010, and 10-2010-0033236 filed on Apr. 12, 2010, U.S. Provisional Application Nos. 61/320,729 filed on Apr. 3, 2010, 61/237,587 filed on Aug. 27, 2009 and 61/322,427 filed on Apr. 9, 2010, all of which are incorporated herein by reference for all purposes as if fully set forth herein.

BACKGROUND OF THE INVENTION

1. Field of the Invention

Exemplary embodiments of the invention relate to a backlight unit and a display device.

2. Description of the Related Art

With the development of the information society, various demands for display devices have been increasing. Various display devices, such as a liquid crystal display (LCD), a plasma display panel (PDP), an electroluminescent display (ELD), and a vacuum fluorescent display (VFD), have been recently studied and used, so as to meet the various demands for the display devices.

Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

Exemplary embodiments of the invention provide a backlight unit and a display device.

Embodiments of the invention provide a light generating device including one or more light source devices each including a light emitting unit such as an LED, which can be used in a backlight unit or other device and which address the limitations and disadvantages associated with the background art.

According to an embodiment, the invention provides a light generating device comprising: a first layer; a plurality of light source devices disposed on the first layer and configured to emit light, at least one of the light source devices including a light emitting diode for generating the light; a reflection layer disposed on the first layer and configured to reflect the light emitted from the light source devices; a second layer covering the light source devices and the reflection layer and configured to propagate the light reflected by the reflection layer, the second layer including a plurality of depressed portions, at least one of the depressed portions disposed between two adjacent light source devices among the plurality of light source devices; and at least one third layer disposed on the second layer and configured to diffuse the light propagated by the second layer.

According to an embodiment, the invention provides a display device comprising: a display panel configured to display images; a backlight unit configured to supply light to the display panel, and including a plurality of light generating blocks, at least one of the light generating blocks including: a first layer, a plurality of light source devices disposed on the first layer and configured to emit light, at least one of the light source devices including a light emitting diode for generating the light, a reflection layer disposed on the first layer and configured to reflect the light emitted from the light source devices, a second layer covering the light source devices and the reflection layer and configured to propagate the light reflected by the reflection layer, the second layer including a plurality of depressed portions, at least one of the depressed portions disposed between two adjacent light source devices among the plurality of light source devices, and at least one third layer disposed on the second layer and configured to diffuse the light propagated by the second layer; and a controller configured to selectively operate the light generating blocks of the backlight unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
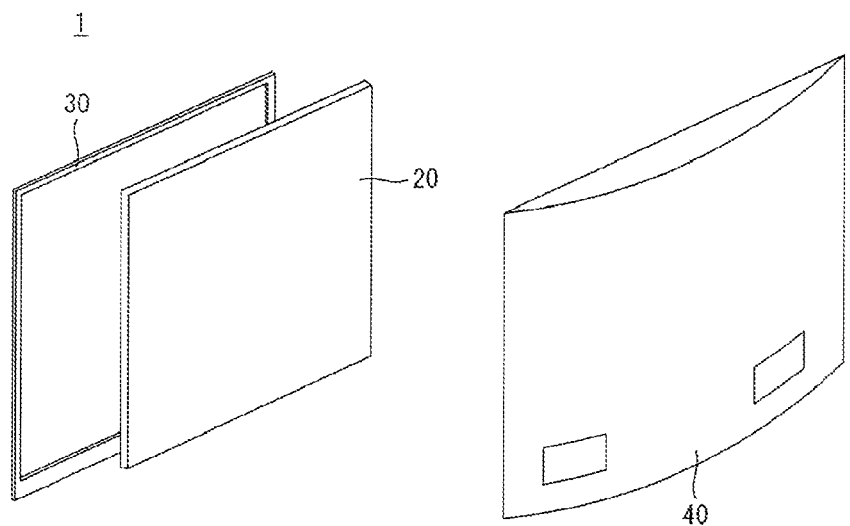
FIG. 1 is an exploded perspective view of a display device according to an embodiment of the invention.

Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention. In the description of each drawing, the same reference characters are used to designate the same or similar components.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Reference will now be made in detail embodiments of the invention examples of which are illustrated in the accompanying drawings. In this regard, each of all display devices, backlight units, light source devices, and any device that includes such backlight unit or light source device discussed below is operatively coupled and configured. Further, a backlight unit according to embodiments of the invention preferably is fixed to a back of a display panel and has a same or similar size as the display panel to correspond to the entire display region of the display panel. Furthermore, such a backlight unit preferably includes a plurality of light sources which are disposed in arrays, lines, patterns, etc. throughout the entire area of the backlight unit that corresponds to the entire display region of the display panel. As such, the light sources are not just located at one side of the display panel, but are preferably dispersed below throughout the entire display region of the display panel. In these figures, arrows indicate a general light emitting direction of the light source, e.g., a general direction in which the light from a light emitting surface of the light source is emitted, but the light from the light source may emit not necessarily in a single line but through an area in the indicated direction.

According to various embodiments of the invention, any one or more features from one embodiment/example/variation of the invention can be applied to (e.g., added, substituted, modified, etc.) any one or more other embodiments/examples/variations discussed below according to the invention. Further any operations/methods discussed below can be implemented in any of these devices/units or other suitable devices/units.

FIG. 1 is an exploded perspective view of a display device 1 according to an embodiment of the invention.

As shown in FIG. 1, the display device 1 may include a front cover 30, a back cover 40, and a display module 20 disposed between the front cover 30 and the back cover 40.

The front cover 30 may be arranged to surround the display module 20 and include a transparent front panel capable of transmitting light. Here, the front panel may be placed in front of the display module 20 at a predetermined distance from the display module 20 to protect the display module 20 from external impact.

Figure 2:
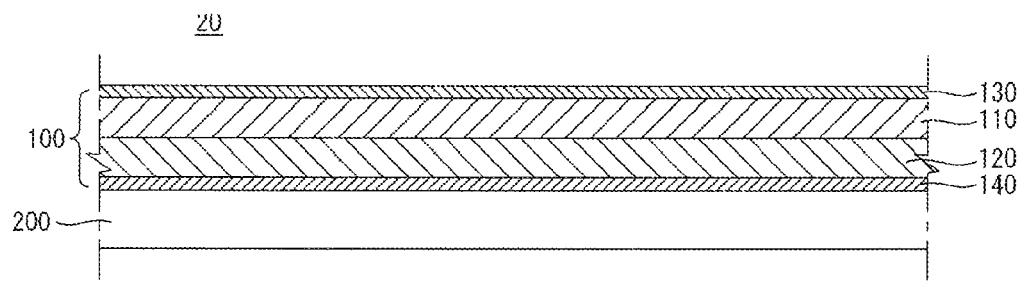
FIG. 2 is a cross-sectional view of the display device according to an embodiment of the invention.

FIG. 2 is a cross-sectional view of the display device shown in FIG. 1.

As shown in FIG. 2, the display module 20 included in the display device may include a display panel 100 and a backlight unit 200, where the backlight unit 200 have a same or similar size and shape as the display panel 100 for supplying light to a display area of the display panel 100.

The display panel 100 may include a color filter substrate 110 and a thin film transistor (TFT) substrate 120 which face each other and are bonded to each other having a uniform cell gap between them. Furthermore, a liquid crystal layer may be interposed between the color filter substrate 110 and the TFT substrate 120.

The color filter substrate 110 may have a plurality of color filters including red, green and blue sub-color filters and generate an image in red, green or blue when light is applied to the color filter substrate 110.

Although a pixel may consist of red, green and blue sub-pixels, the pixel is not limited thereto and may be composed with various combinations of sub-pixels. For example, a single pixel may include red, green, blue and white sub-pixels.

The TFT substrate 120 includes a plurality of switching elements such as TFTs which can switch pixel electrodes.

The liquid crystal layer is composed of a plurality of liquid crystal molecules. The liquid crystal molecules may change their arrangement according to a voltage difference between a pixel electrode and a common electrode, and thus light provided by the backlight unit 200 may be input to the color filter substrate 110 according to a variation in the arrangement of the liquid crystal molecules of the liquid crystal layer.

An upper polarizer 130 and a lower polarizer 140 may be respectively attached to the top and bottom sides of the display panel 100. Specifically, the upper polarizer 130 may be formed on the top face of the color filter substrate 110 and the lower polarizer 140 may be formed on the bottom face of the TFT substrate 120.

A gate driver and a data driver which generate driving signals for driving the display panel 100 may be provided on the sides of the display panel 100.

The above-described structure and configuration of the display panel 100 are exemplary and may be modified, added or deleted.

As shown in FIG. 2, the display device may be constructed in such a manner that the backlight unit 200 is attached to the display panel 100. For example, the backlight unit 200 may be attached and fixed to the bottom face of the display panel 100, specifically, the lower polarizer 140. To achieve this, an adhesive layer may be formed between the lower polarizer 140 and the backlight unit 200.

When the backlight unit 200 is attached to the display panel 100 as described above, the thickness of the display device can be reduced so as to improve the external appearance of the display device and a structure for fixing the backlight unit 200 can be removed to simplify the structure and manufacturing process of the display device. Furthermore, the gap between the backlight unit 200 and the display panel 100 can be decreased, and thus an abnormal operation of the display device or a deterioration in the quality of images displayed on the display device due to infiltration of particles into the gap can be prevented.

The backlight unit 200 may be configured in the form of a plurality of laminated functional layers and at least one of the functional layers may include a plurality of light sources (e.g., light sources 220 discussed below). In this regard, these light sources 220 are arranged throughout the backlight unit 200 in arrays, lines, patterns, etc. and provide light to the display panel 100.

Furthermore, the backlight unit 200, specifically, the layers forming the backlight unit 200 may be formed of soft materials to attach and fix the backlight unit 200 to the bottom face of the display panel 100.

Moreover, a bottom cover in which the backlight unit is mounted may be provided under the backlight unit 200.

The display panel 100 may be segmented into a plurality of regions and brightness of lights emitted from regions of the backlight unit 200, which respectively correspond to the segmented regions of the display panel 100, that is, brightness of corresponding light sources, may be adjusted selectively and independently from each other according to gray peak values or color coordinate signals of the segmented regions to control the brightness of the display panel 100.

For this, the backlight unit 200 may be divided into a plurality of driving regions respectively corresponding to the segmented regions of the display panel 100 and the split driving regions may be independently operated. That is, each of the regions of the display panel 100 may be independently driven for being turned on/off, providing dimming effects, etc.

Figure 3:
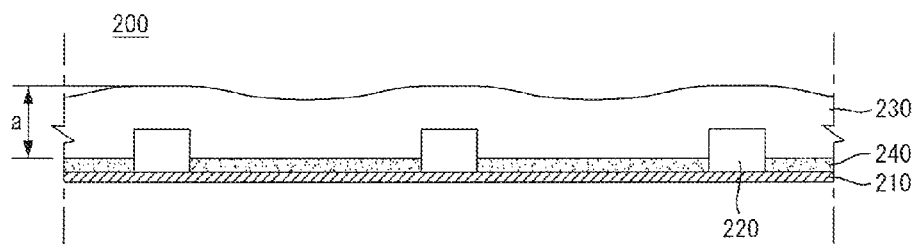
FIG. 3 is a cross-sectional view of a backlight unit according to an embodiment of the invention.

FIG. 3 is a cross-sectional view of the backlight unit 200 according to an embodiment of the invention.

As shown in FIG. 3, the backlight unit 200 may include a substrate 210, a plurality of light sources 220, a resin layer 230, and a reflection layer 240. As mentioned above, the backlight unit 200 in this or other embodiments may have a same or similar size as the display panel 100 so that it covers the entire display area of the display panel 100. Thus the light sources 220 in this or other embodiments are provided throughout the entire area of the backlight unit 200 so that these light sources 220 are dispersed below the entire display area of the display panel 100. The light sources 220 can be dispersed in a matrix pattern, in lines or arrays, etc.

The light sources 220 may be formed on the substrate 210 and the resin layer 230 may be formed on the substrate 210 to cover the light sources 220. For instance, the resin layer 230 encapsulates (covers entirely) the light sources 220 on the substrate 210.

An electrode pattern for connecting a connector and the light sources 220 may be formed on the substrate 210. For example, a carbon nano tube electrode pattern for connecting the light sources 220 and the connector may be formed on the substrate 210. The connector may be electrically connected to a power supply unit which supplies power to the light sources 220.

The substrate 210 may be a printed circuit board (PCB) including poly ethylene terephthalate, glass, polycarbonate, silicon, etc. The substrate 210 may be a film substrate.

The light sources 220 may be light emitting diode (LED) chips or LED packages each including at least one LED chip. The LED packages can be used as the light sources 220 in this implementation.

Each light source 220 may be a color LED emitting at least one of red, green and blue or a white LED. The color LED may include at least one of a red LED, a blue LED and a green LED. The arrangement of LEDs and lights emitted from the LEDs may be varied.

The resin layer 230 formed on the substrate 210 may transmit and diffuse light emitted from the light sources 220 such that the light can be uniformly provided to the display panel 100. The resin layer 230 may have a first concave portion recessed toward the substrate 210. The first concave portion will be explained in detail later with reference to FIG. 9 and will not be shown in FIGS. 4 through 8 for convenience of explanation.

The reflection layer 240 that reflects the lights emitted from the light sources 220 may be formed between the substrate 210 and the resin layer 230, specifically, on the substrate 210.

The reflection layer 240 may reflect lights that are total-reflected from the boundary of the resin layer 230 such that the lights emitted from the light source 220 can be diffused more widely.

The reflection layer 240 may use a plastic sheet in which white pigment such as titanium dioxide is dispersed, a plastic sheet on which a metal layer is laminated, and a plastic sheet in which bubbles are dispersed to scatter lights. Silver (Ag) may be coated on the surface of the reflection layer 240 to improve reflectivity. Furthermore, the reflection layer 240 may be coated on the substrate 210.

The resin layer 230 may be formed of various resins having light transmissivity. For example, the resin layer 230 may be formed of one or at least two materials selected from a group consisting of polyethylene terephthalate, polycarbonate, polypropylene, polyethylene, polystyrene, polyepoxy, silicon and acryl.

The resin layer 230 may have a refractive index in the range of 1.4 to 1.6 such that the lights emitted from the light sources 220 are diffused and thus the backlight unit 200 has a uniform brightness.

The resin layer 230 may include a polymer having adhesive property such that the resin layer 230 is securely attached to the light sources 220 and the reflection layer 240. For example, the resin layer 230 may be formed of material including acrylic resins such as unsaturated polyester, methylmethacrylate, ethylmethacrylate, isobutylmethacrylate, normal butylmethacrylate, normal butylmethylmethacrylate, acrylic acid, methacrylic acid, hydroxyethylmethacrylate, hydroxypropylmethacrylate, hydroxyethylacrylate, acrylamide, methylolacrylamide, glycidylmethacrylate, ethylacrylate, isobutylacrylate, normal butylacrylate, 2-ethylhexylacrylate polymer, copolymer or terpolymer, urethane reins, epoxy resins and melamine resins.

The resin layer 230 may be formed by coating a liquid or gel resin on the substrate 210 on which the light sources 220 and the reflection layer 240 are formed and baking the coated resin. Otherwise, the resin layer 230 may be separately formed and attached onto the substrate 210.

As the thickness $\alpha$ of the resin layer 230 increases, the lights emitted from the light sources 220 are diffused more widely and thus lights with uniform brightness can be provided to the display panel 100 from the backlight unit 200. Furthermore, as the thickness $\alpha$ of the resin layer 230 increases, the quantity of light absorbed by the resin layer 230 increases and thus the brightness of light provided to the display panel 100 from the backlight unit 200 can be reduced.

Accordingly, the resin layer 230 may have a thickness in the range of 0.1 to 4.5 mm to prevent the brightness of the light provided to the display panel 100 from the backlight unit 200 from decreasing, and to provide lights with uniform brightness.

Figure 4:
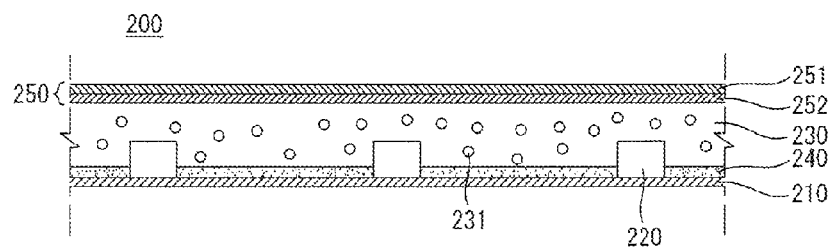
FIG. 4 is a cross-sectional view illustrating another configuration of the backlight unit according to the exemplary embodiment of the invention.

FIG. 4 is a cross-sectional view illustrating another configuration of the backlight unit according to the exemplary embodiment of the invention. Explanations of components described with reference to FIG. 3 are omitted.

As shown in FIG. 4, the light sources 220 may be mounted on the substrate 210 and the resin layer 230 may be formed on the substrate 210. The reflection layer 240 may be formed between the substrate 210 and the resin layer 230.

The resin layer 230 may include a plurality of scattering particles 231. The scattering particles may scatter or refract the lights emitted from the light sources 220 to diffuse the lights more widely.

The scattering particles 231 may be made of a material having a refractive index different from that of the resin layer 230, e.g., a material having a refractive index higher than that of silicon or acrylic resin forming the resin layer 230 to scatter or refract the lights emitted from the light sources 220.

For example, the scattering particles 231 may be made of polymethylmethacrylate/styrene copolymer (MS), polymethylmethacrylate (PMMA), polystyrene (PS), silicon, TiO2, SiO2, or combinations of these materials.

The scattering particles 231 may be made of a material having a refractive index lower than that of the resin layer 230. For example, the scattering particles 231 may be obtained by forming bubbles in the resin layer 230.

The material forming the scattering particles 231 is not limited to the aforementioned materials and the scattering particles 231 may be formed using various polymers and inorganic materials.

The resin layer 230 may be formed by mixing the scattering particles 231 with a liquid or gel resin, coating the mixture on the substrate 210 on which the light sources 220 and the reflection layer 240 are formed and baking the coated material.

As shown in FIG. 4, an optical sheet 250 may be provided on the resin layer 230. The optical sheet 250 may include a prism sheet 251 and a diffusion sheet 252. The sheets included in the optical sheet 250 may be attached to each other to minimize the thickness of the optical sheet 250 or the backlight unit 200.

The bottom face of the optical sheet 250 may be attached to the resin layer 230 and the top face of the optical sheet 250 may be attached to the display panel 100, e.g., the lower polarizer 140.

The diffusion sheet 252 diffuses incident light to prevent lights from the resin layer 230 from being partially concentrated so as to achieve uniform brightness. The prism sheet 251 may focus lights from the prism sheet 252 such that the lights can be input to the display panel 100 in a direction substantially perpendicular to the plane of the display panel 100.

In an alternative implementation, at least one of the prism sheet 251 and the diffusion sheet 252 may be removed or various functional layers may be added to the prism sheet 251 and the diffusion sheet 252.

LED packages forming the light sources 220 in the direct light type backlight unit can be classified into a top-view type and a side-view type according to the direction of light-emitting surface of the LED packages. The top-view type and the side-view type will now be explained.

FIGS. 5, 6, 7 and 8 illustrate different examples of a backlight unit according to an exemplary embodiment of the invention.

Figure 5:
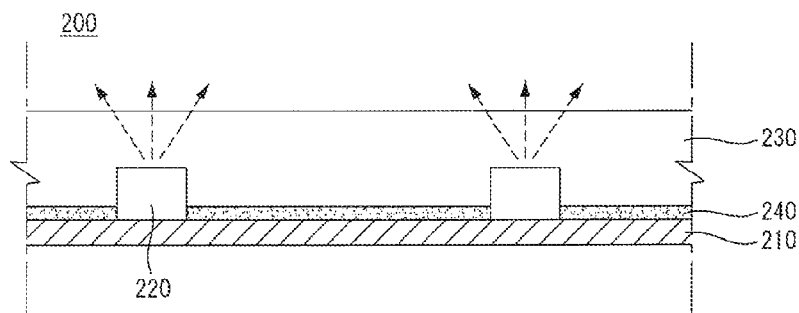
FIGS. 5, 6, 7 and 8 illustrate examples of a backlight unit according to an exemplary embodiment of the invention.

FIG. 5 illustrates a top-view type backlight unit 200 according to an embodiment of the invention.

As shown in FIG. 5, the light sources 220 included in the backlight unit 200 are arranged such that the light-emitting surfaces of the light sources 220 correspond to the upper surface thereof to emit lights in a direction generally perpendicular to the plane of the substrate 210 or the reflection layer 240. For instance, the light sources 220 have the light-emitting surfaces through which the light from the light emitting element (e.g., LED) is emitted at the top of the light sources 200 so that the light is emitted in an upward direction indicated by an arrow.

Figure 6:
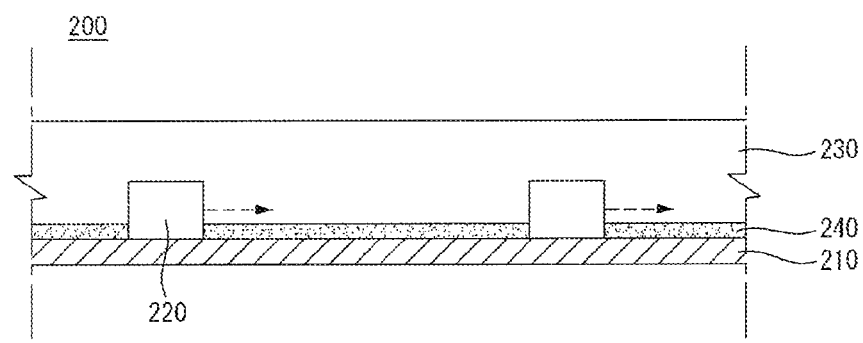

FIG. 6 illustrates a side-view type backlight unit 200 according to an embodiment of the invention.

As shown in FIG. 6, the light sources 220 included in the backlight unit 200 are arranged such that the light-emitting surfaces of the light sources 220 correspond to the sides of the light sources 220 to emit lights in a direction generally parallel with the substrate 210 or the reflection layer 240. For instance, the light sources 220 have the light-emitting surfaces through which the light from the light emitting element (e.g., LED) is emitted at the side of the light sources 200 so that the light is emitted in a lateral direction indicated by an arrow. For example, the light sources 220 may be composed using side-view type LED packages. In this case, it is possible to reduce the light sources 220 from being observed as hot spots on a screen of the display device and reduce the thickness of the resin layer 230 to achieve a slim display device.

Figure 7:
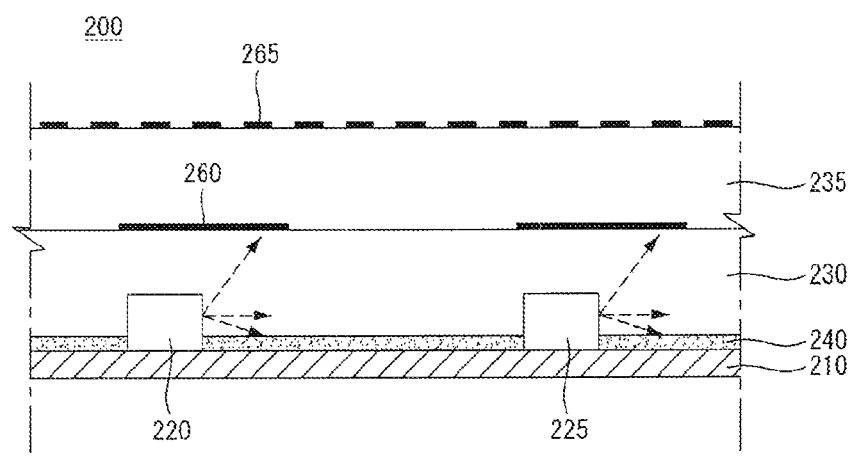

As shown in FIG. 7, the backlight unit 200 may include a first resin layer 230 and a second resin layer 235. Lights emitted from the sides of the light sources 22Q in the lateral light emitting direction may transmit through the first resin layer 230 and reach a neighboring light source 225.

Parts of the lights transmitting through the first resin layer 230 may travel toward the display panel 100 located on the backlight unit 200. For this, the first resin layer 230 may include the scattering particles 231 to scatter or refract the lights upward, as described above with reference to FIG. 4.

Parts of the lights emitted from the light sources 220 may be input to the reflection layer 240. The lights input to the reflection layer 240 may be reflected upward and diffused.

Meantime, a large quantity of lights may be emitted in regions in proximity to the light sources 220 due to strong scattering near the light sources 220 or lights emitted from the light sources 220 in directions close to the upward direction, and thus lights with high brightness may be partially observed on the screen of the display device. To address this, first light-shielding patterns 260 may be formed on the first resin layer 230 to reduce the brightness of lights emitted from the regions in proximity to the light sources 220, as shown in FIG. 7. Accordingly, lights with uniform brightness can be emitted from the backlight unit 200. For example, the first light-shielding patterns 260 may be formed on the first resin layer 230 such that the first light-shielding patterns 260 respectively correspond to the light sources 220. The first light-shielding patterns 260 may partially shield/block the lights emitted from the light sources 220 and partially transmit the lights to reduce the brightness of the lights emitted upward. That is, any light shielding pattern/layer in this or other embodiments of the invention does not necessarily mean that the light is blocked entirely (although it can if desired), and such light shielding pattern/layer should be interpreted to mean that it can partially transmit the light and/or partially block or reflect the light.

The first light-shielding patterns 260 may be formed of TiO2. In this case, the first light-shielding patterns 260 may partially reflect the lights emitted from the light sources 220 downward and partially transmit the lights.

A second resin layer 235 may be formed on the first resin layer 230. The second resin layer 235 may be formed of a material identical to or different from that of the first resin layer 230. The second resin layer 235 may diffuse lights emitted upward from the first resin layer 230 to improve the uniformity of the brightness of the backlight unit 200.

The second resin layer 235 may be formed of a material having a refractive index identical to or different from that of the first resin layer 230.

If the second resin layer 235 is formed of a material having a refractive index higher than that of the first resin layer 230, lights emitted from the first resin layer 230 can be diffused more widely.

If the second resin layer 235 is formed of a material having a refractive index lower than that of the first resin layer 230, the reflectivity of lights emitted from the first resin layer 230 and reflected from the bottom surface of the second resin layer 235 can be improved, and thus the lights emitted from the light sources 220 can transmit through the first resin layer 230 more easily.

The first resin layer 230 and the second resin layer 235 may include a plurality of scattering particles. In this case, the density of scattering particles included in the second resin layer 235 may be higher than the density of scattering particles included in the first resin layer 230. When the second resin layer 235 includes scattering particles in a density higher than the density of the scattering particles included in the first resin layer 230, lights emitted upward from the first resin layer 230 can be diffused more widely, and thus the uniformity of the brightness of light emitted from the backlight unit 200 can be improved.

As shown in FIG. 7, second light-shielding patterns 265 may be formed on the second resin layer 235 to allow the brightness of lights emitted from the second resin layer 235 to be uniform. For example, if lights emitted upward from the second resin layer 235 are concentrated on a specific portion to increase the brightness of a specific point of the screen, the second light-shielding pattern 265 may be formed on a region of the second resin layer 235, which corresponds to the specific portion, to reduce the brightness of light at the specific portion so as to allow the brightness of light emitted from the backlight unit 200 to be uniform. As a variation, the first light-shielding patterns 260 may be formed within the first resin layer 230, and/or the second light-shielding patterns 265 may be formed within the second resin layer 235.

The second light-shielding patterns 265 may be formed of TiO2. In this case, the second light-shielding patterns 265 may partially reflect lights emitted from the second resin layer 235 downward and partially transmit the lights.

Figure 8:
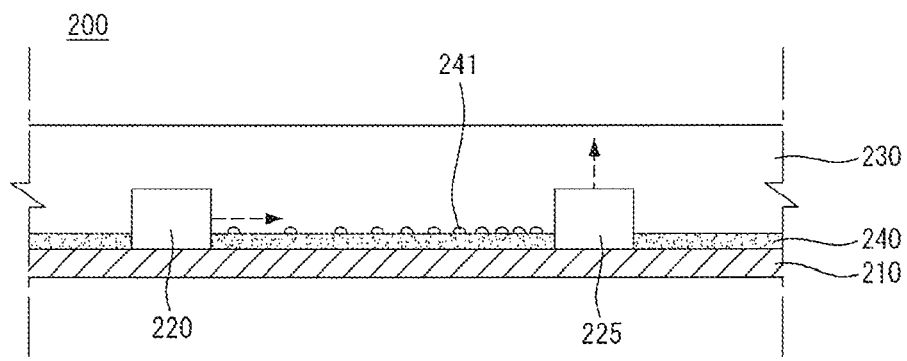
Figure 9:
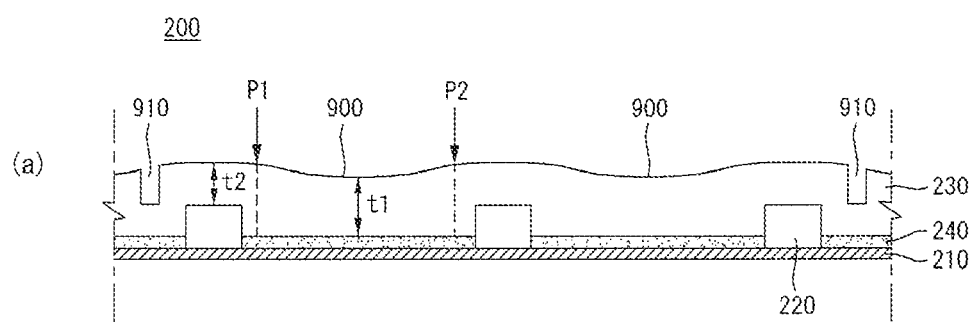
FIGS. 9 through 18 are views for explaining examples of a resin layer according to an embodiment of the invention.
Figure 9:
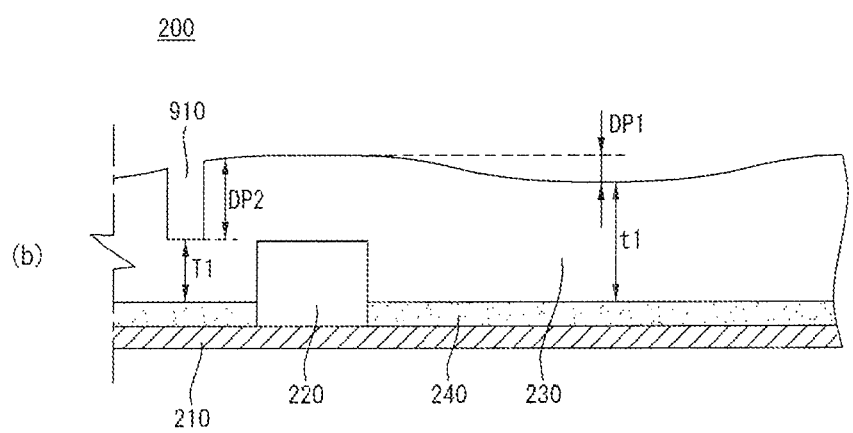

As shown in FIG. 8, the reflection layer 240 may include a pattern for facilitating traveling of light emitted from a particular light source 220 to a neighboring light source 225.

The pattern that is formed on the reflectively layer 240 may include a plurality of protrusions 241. Light emitted from the light source 220 and then impinging on the plurality of protrusions 241 may be scattered or refracted in the light traveling direction (indicated by the arrow).

As shown in FIG. 8, the density of the protrusions 241 formed on the reflection layer 240 may increase as the protrusions 241 are further away from the particular light source 220 (that is, as the protrusions 241 are closer to the neighboring light source 225). Accordingly, the brightness of light emitted upward from a region at a further distance from the light source 220 (that is, a region near the neighboring light source 225), can be prevented from decreasing, and thus the uniformity of the brightness of light provided by the backlight unit 200 can be maintained.

The protrusions 241 may be formed of the same material as the reflection layer 240. In this case, the top face of the reflection layer 240 may be processed to form the protrusions 241.

Otherwise, the protrusions 241 may be formed of a material different from that of the reflection layer 240. The protrusions 241 may be formed by printing the pattern as shown in FIG. 8 on the reflection layer 240.

The protrusions 241 are not limited to the shape or size shown in FIG. 8 and may be formed in various shapes including a prism and varying reasonable sizes.

FIGS. 9 through 17 are views for explaining the resin layer in more detail according to embodiments of the invention. Explanations of components described above may be omitted below. For, detailed explanations of the reflection layer and the light-shielding patterns are omitted. As such, in the backlight unit 200 of FIGS. 9-17, any of the variations of the resin layer(s) and the light-shielding patterns discussed above can be applied.

As shown in FIGS. 9(a) and 9(b), the resin layer 230 formed on the substrate 210 on which the light sources 220 are arranged may include first concave portions (or first depressed portions) 900 recessed toward the substrate 210. Here, the first concave portion 900 may be disposed between two neighboring light sources 220. For instance, the resin layer 230 may be recessed between the two neighboring light sources 220. In other words, both ends P1 and P2 of the first concave portion 900 may be at a predetermined distance from the two neighboring light sources 220.

Here, top-view type light sources 220 with a light-emitting surface facing a direction perpendicular to the plane of the substrate 210 or side-view type light sources 220 with a light-emitting surface facing a direction parallel with the substrate 210 can be used.

When the first concave portion 900 is formed in the resin layer 230, the contact area between the resin layer 230 and a particular layer formed on the resin layer 230 (for example, an optical sheet), can be increased so as to improve the adhesive strength. Accordingly, the structural stability of the backlight unit 200 can be enhanced. Furthermore, because of the increased contact area due to the first concave portion 900, sufficient adhesive strength of the resin layer 230 and the particular layer can be secured even if a relatively small amount of adhesive material may be used to attach the resin layer 230 and the particular layer to each other to as to reduce the thickness of the backlight unit 200.

The thickness of the resin layer 230 may be reduced to decrease the thickness of the backlight unit 200. The resin layer 230 may be formed on the light sources 220 to protect the light sources 220 from external impact.

Accordingly, the resin layer 230 may be formed such that the thickness t2 of the resin layer 230 on the light sources 220 is less than the thickness of the resin layer 230 in other regions to protect the light sources 220 while reducing the thickness of the backlight unit 200. Thus, the minimum thickness t1 of the resin layer 230 corresponding to the concave portion 900 may be greater than the thickness t2 of the resin layer 230 above the light sources 220.

Furthermore, the resin layer 230 may include a second concave portion 910 having a shape different from the first concave portion 910.

The second concave portion 910 may be arranged between blocks for local dimming and reduce lights from entering neighboring blocks during a local dimming operation to improve the contrast of displayed images so as to enhance the quality of the displayed images. The configuration of the neighboring blocks for the local dimming operation and other selective/independent control operations will be discussed in more detail later referring to FIG. 26.

As shown in FIG. 9(b), the second concave portion 910 may have a depth DP2 different from the depth DP1 of the first concave portion 900. The depth DP2 of the second concave portion 910 may be greater than the depth DP1 of the first concave portion 900 to reduce lights from entering neighboring blocks during a local dimming operation. In other words, the thickness T1 of the resin layer 230 corresponding to the second concave portion 910 may be less than the thickness t1 of the resin layer 230 corresponding to the first concave portion 900.

As described above, the resin layer 230 may include at least two concave portions having different depths. That is, the resin layer 230 may include the first and second concave portions 900 and 910 having different depths. The second concave portion 910 will be explained in more detail later.

In case the side-view type light sources 200 are used, the optical characteristics of the backlight unit 200 may be improved if the resin layer 230 includes the first concave portions 900, which will now be described with reference to the FIG. 10.

Figure 10:
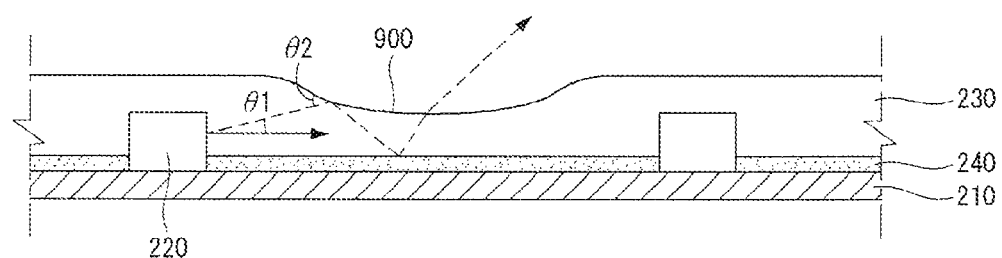
Figure 11:
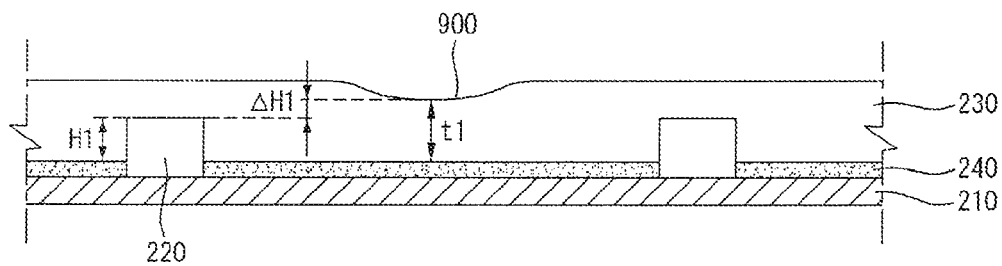
Figure 12:
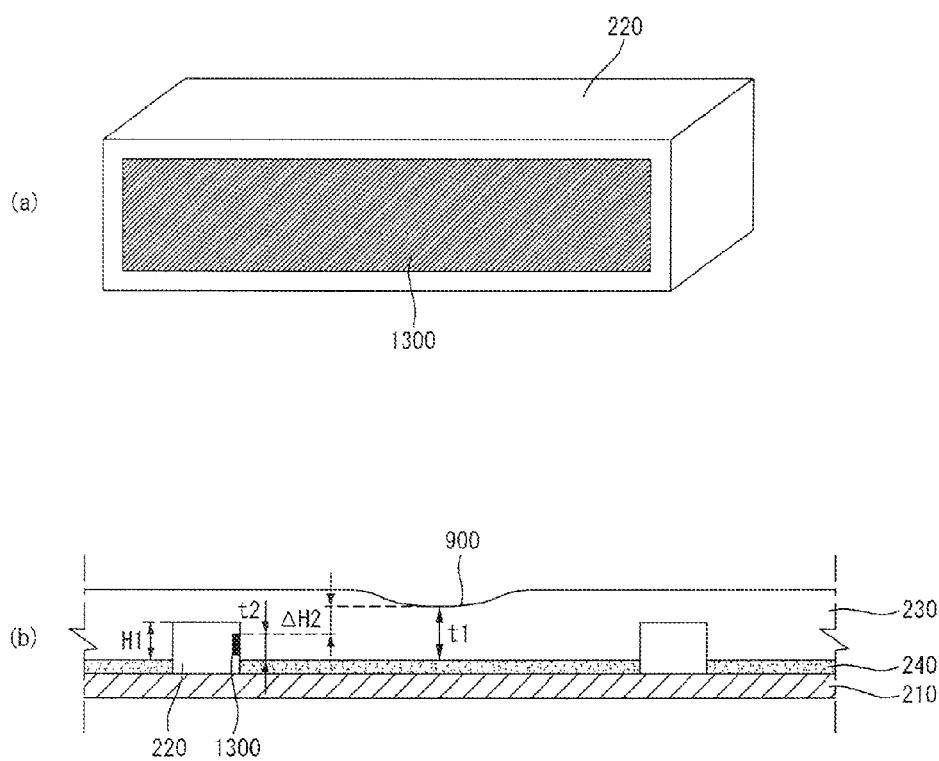

As shown in FIG. 10, when the first concave portion 900 is formed in the resin layer 230, light emitted from a particular light source 220 at an angle θ1 to the plane of the substrate 210 may reach the first concave portion 900 at an angle θ2. Here, the light arrived at the first concave portion 900 may be reflected by the first concave portion 900. The light reflected by the first concave portion 900 is input to the reflection layer 240 at a relatively large angle and reflected by the reflection layer 240. The light reflected by the reflection layer 240 may be arrived at the surface of the resin layer 230 at a relatively large angle and transmit through the resin layer 230. When the first concave portion 900 is formed in the resin layer 230, the light reflected in the resin layer 230 can be diffused by the first concave portion 900, which reduces the light loss so as to improve optical efficiency. That is, the optical characteristic of the backlight unit can be enhanced by the formation of the first concave portions 900 between the light sources 220.

The minimum thickness t1 of the first concave portion 900 formed in the resin layer 230 may be controlled. For example, the minimum thickness t1 of the first concave portion 900 may be greater than the height H1 of the light source 220, measured from the reflection layer 240, by a distance ΔH1.

In this case, the first concave portion 900 may be easily formed. For instance, the minimum thickness t1 of the first concave portion 900 may be greater than the height H1 of the light source 220, measured from the reflection layer 240, to facilitate the manufacturing process.

Furthermore, the minimum thickness t1 of the first concave portion 900 may be determined in consideration of the light-emitting face of the light source 220.

As shown in FIG. 12(a), the particular light source 220 may include a light-emitting face/surface 1300 emitting light generated by a light emitting element such as a LED in the light source 220. If the light source 220 is a side-view type light source, the horizontal length of the light-emitting face 1300 may be greater than the vertical length thereof. Accordingly, it is possible to improve the brightness characteristic of the backlight unit while reducing the thickness of the backlight unit.

In consideration of the light-emitting face 1300 of the light source 220, the lowest surface of the first concave portion 900 may be located higher than the light-emitting face 1300 of the light source 220, as shown in FIG. 12(b). In other words, the minimum thickness t1 of the first concave portion 900, measured from the reflection layer 240, may be greater than the height t2 of the light-emitting face 1300 of the light source 220, measured from the reflection layer 240.

Figure 13:
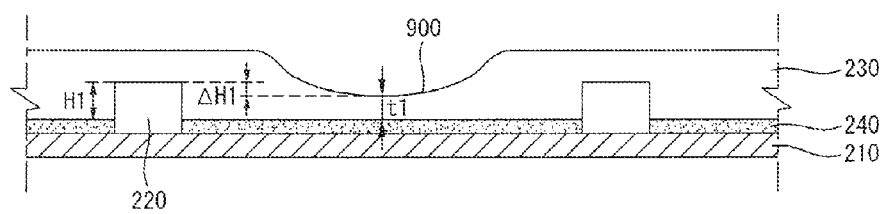

As shown in FIG. 13, the minimum thickness t1 of the first concave portion 900 may be less than the height H1 of the light source 220, measured from the reflection layer 240, by a distance ΔH1.

In this case, the first concave portion 900 can reflect the light emitted from the side of the side-view type light source 220 to the reflection layer 240 to enhance the optical characteristic of the backlight unit.

Figure 14:
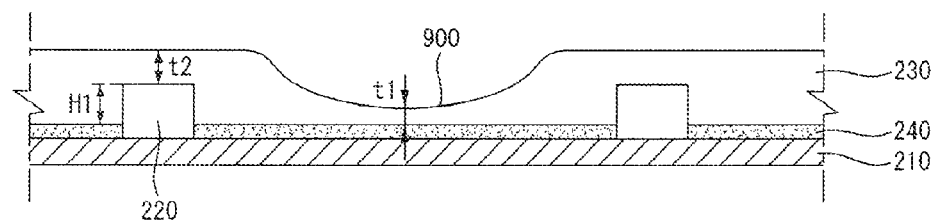

As shown in FIG. 14, the minimum thickness t1 of the first concave portion 900 of the resin layer 230 may be less than the height H1 of the light source 220, measured from the reflection layer 240, and the thickness t2 of the resin layer 230 corresponding to the light source 220. In this case, light reflection according to the first concave portion 900 can be further increased so as to improve the optical characteristic of the backlight unit.

Figure 15:
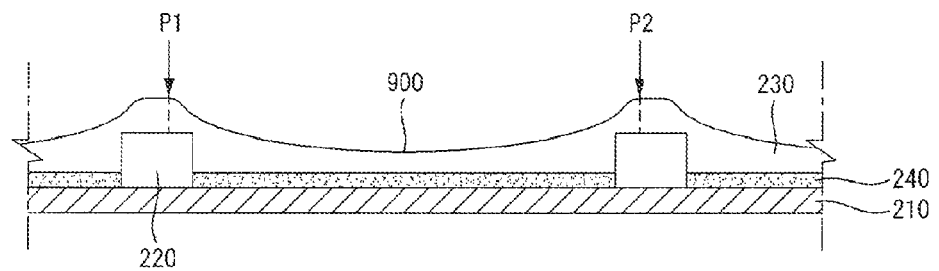
Figure 16:
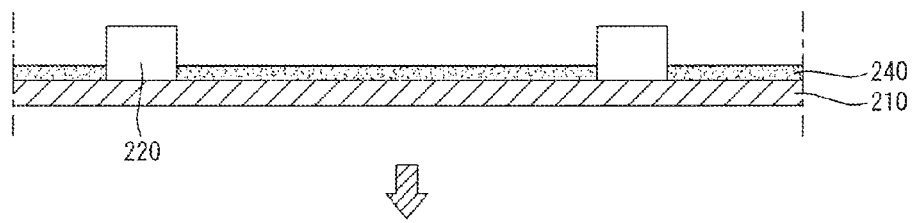
Figure 16:
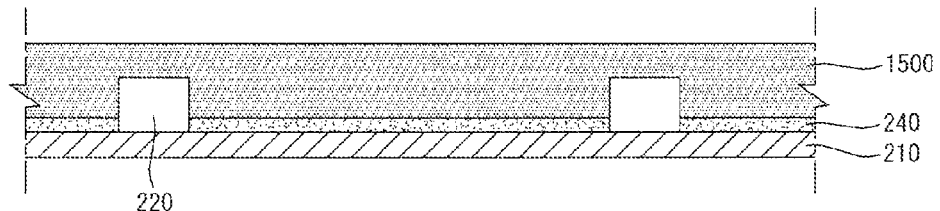
Figure 16:
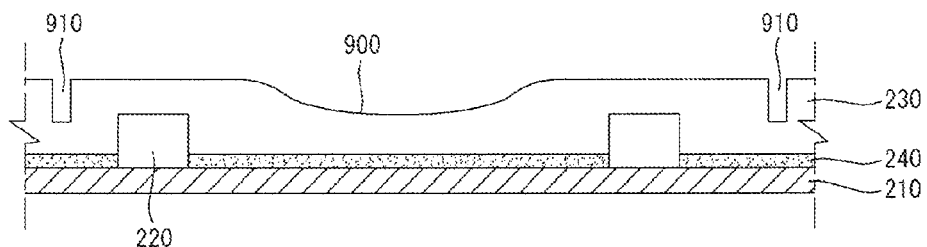
Figure 17:
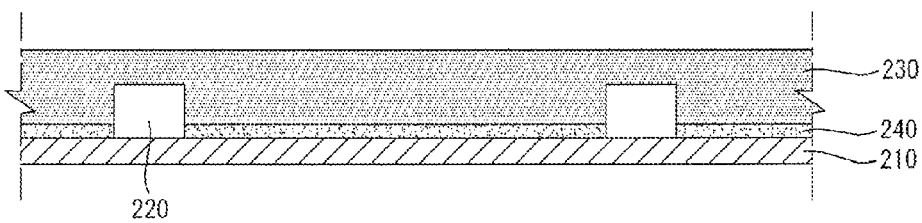
Figure 17:
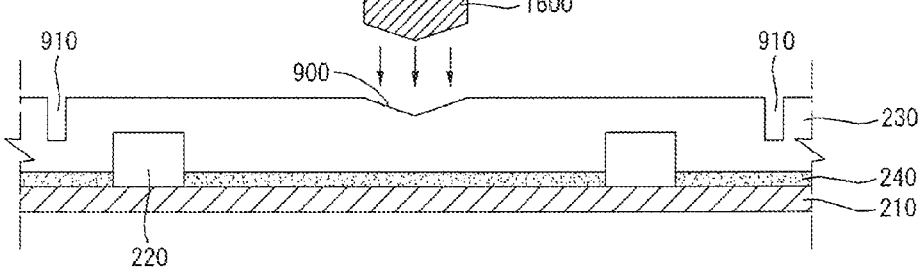

As shown in FIG. 15, the first concave portion 900 may be partially overlapped with the light sources 220. For example, both ends P1 and P2 of the first concave portion 900 may be respectively disposed on neighboring light sources 220. Even in this case, the optical characteristic can be further improved.

A method of manufacturing the first concave portion 900 will now be explained according to an embodiment of the invention.

As shown in FIG. 16(a), the light sources 220 may be mounted on the substrate 210, and then the reflection layer 240 may be formed on the substrate 210.

As shown in FIG. 16(b), a liquid or gel resin may be coated on the substrate 210 on which the light sources 220 and the reflection layer 240 are formed to form a resin material layer 1500. Otherwise, the previously manufactured resin material layer 1500 in the form of a sheet may be laminated on the substrate 210.

Then, the resin material layer 1500 may be dried. Otherwise, low-temperature heat may be applied selectively to the resin material layer 1500 to dry the resin material layer 1500. Then, the resin material layer 1500 shrinks to form the first concave portion 900, as shown in FIG. 16(c).

The resin layer 230 may be selectively etched to form the second concave portion 910 during the process of forming the first concave portion 900. For example, a laser beam is irradiated to a predetermined portion of the resin layer 230 to etch the portion so as to form the second concave portion 910.

When the first concave portion 900 is formed through the drying method as described above, the viscosity of the resin material layer 1500 may be appropriately controlled. For example, the viscosity of the resin material layer 1500 may be controlled within a preferred range to form a concave portion in the resin layer 230 while the resin material layer 1500 is dried.

After the resin material layer 1500 is formed on the substrate 210, as shown in FIG. 17(a), the first concave portion 900 may be formed in a predetermined portion of the resin material layer 1500 using a blade 1600, as shown in FIG. 17(b). For instance, the blade 1600 or the like may cut out or make an indent at the resin material layer 1500 to form the first concave portion 900. When the first concave portion 900 is formed in the resin material layer 1500 using the blade 1600, the first concave portion 900 may be formed after the resin material layer 1500 is dried.

Furthermore, a predetermined portion of the resin layer 230 may be etched to form the second concave portion 910 during the process of forming the first concave portion 900.

Figure 18:
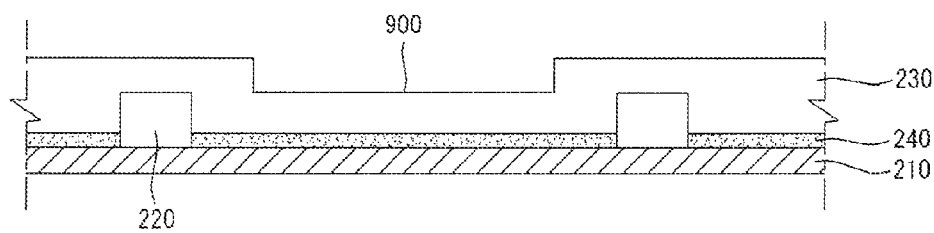
Figure 18:
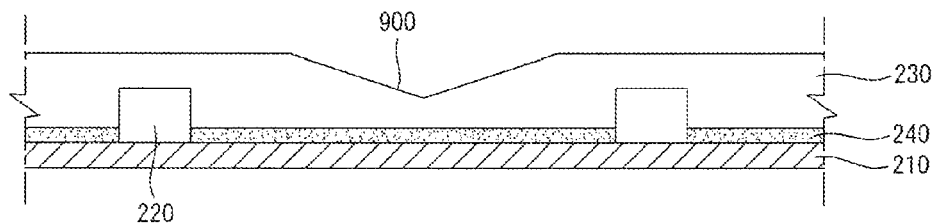
Figure 18:
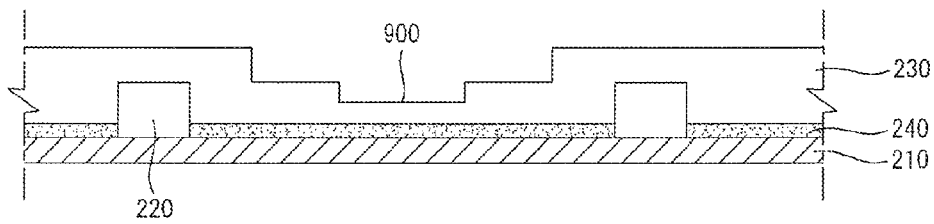

When the first concave portion 900 is formed using the blade 1600 or other means, as described above, the first concave portion 900 may be formed in various shapes. For example, the first concave portion 900 may have various forms as shown in FIGS. 18(*a*), 18(*b*) and 18(*c*). Known techniques may be used to form the first concave portion 910 at the resin material layer 1500.

FIGS. 19 through 25 are views for explaining examples of the backlight unit when the backlight unit includes a diffusion plate 1800 according to an embodiment of the invention.

Figure 19:
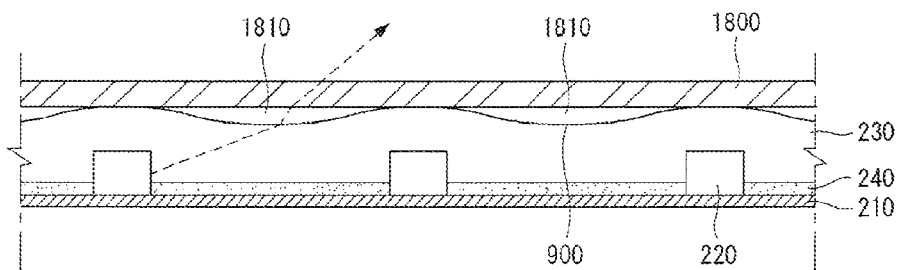
FIGS. 19 through 25 are views for explaining examples of a backlight unit including a diffusion plate according to an embodiment of the invention.

As shown in FIG. 19, the diffusion plate 1800 may be disposed on the resin layer 230 with the first concave portion 900.

The diffusion plate 1800 is preferably a hard plate, and thus the diffusion plate 1800 may function as a supporter for supporting other functional layers and diffusing lights emitted from the light sources 220.

The diffusion plate 1800 may include a plurality of beads and scatter incident light using the beads to prevent the light from being concentrated on a specific portion.

The diffusion plate 1800 may be made of a material including polycarbonate (PC), polymethylmethacrylate (PMMA), cyclic olefin copolymer (COC), etc.

An air layer 1810 may be formed between the diffusion plate 1800 and the resin layer 230. The air layer 1810, although referred to herein as a layer, is air gaps that are formed between the resin layer 230 and the diffusion plate 1800 (or any layer formed on the resin layer 230). Since the resin layer 230 has the first concave portion 900 (depressed portions) and the diffusion plate 1800 in the form of a hard plate is disposed on the resin layer 230, the air layer 1810 (one or more air gaps) is formed between the diffusion plate 1800 and the first concave portion 900 of the resin layer 230.

The air layer 1810 has a refractive index of 1, which is different from those of the resin layer 230 and the diffusion plate 1800. When a layer having a refractive index different from those of the resin layer 230 and the diffusion plate 1800 (that is, the air layer 1810), is formed between the resin layer 230 and the diffusion plate 1800, the lights emitted from the light sources 220 can be diffused more effectively.

By having the air layer 1810 and due to the varying refractive indexes of the air layer 810, the resin layer 230 and the diffusion plate 180 in this or other figures, the lights emitted from the light sources 220 are diffused more effective, which in turn provide a uniform light emission through the entire area of the backlight unit corresponding to the display area of the display panel where the images are displayed. This is advantageous since by merely modifying how the layers are patterned and formed within the backlight unit, a display device with more uniform light emission characteristics without hot spots or with minimum hot spots can be provided.

Figure 20:
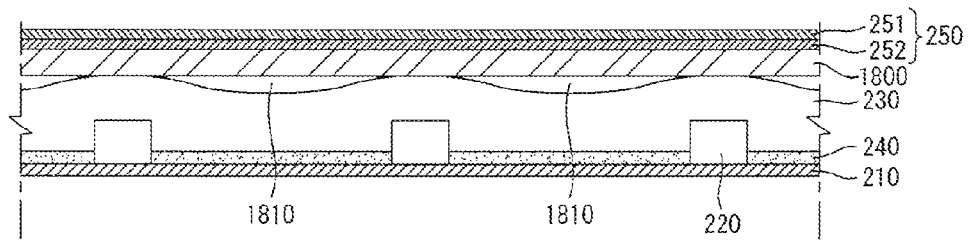

In another example, as shown in FIG. 20, the optical sheet 250 may be disposed on the diffusion plate 1800. The optical sheet 250 has been described in detail with reference to FIG. 4.

Figure 21:
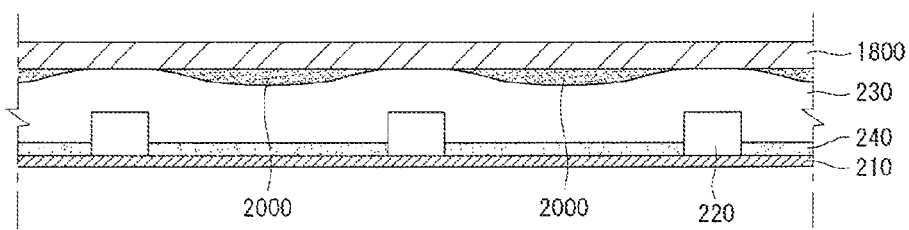

In another example, as shown in FIG. 21, an adhesive layer 2000 may be formed between the diffusion plate 1800 and the resin layer 230. In this case, the adhesive strength of the diffusion plate 1800 and the resin layer 230 is improved, and thus the structural stability of the backlight unit can be enhanced. The adhesive layer 2000 may have a refractive index lower than that of the resin layer 230 to achieve an effect similar to the effect of the air layer 1810 formed between the diffusion plate 1800 and the resin layer 230.

Furthermore, the refractive index of the adhesive layer 2000 may be greater than that of the resin layer 230 to reflect light input to the adhesive layer 2000 such that the reflection layer 240 reflects the reflected light to facilitate diffusion of light.

As shown in FIG. 21, the adhesive layer 2000 may be formed only on the first concave portion 900. In this case, the adhesive layer 2000 may not be formed between the light sources 220 and the diffusion plate 1800.

Figure 22:
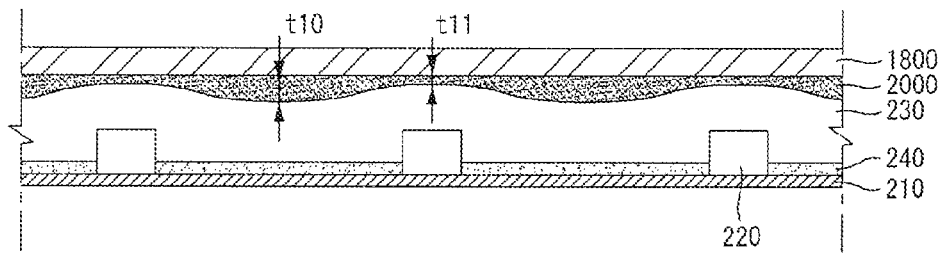

As a variation to FIG. 21, as shown in FIG. 22, the adhesive layer 2000 may be formed even between the diffusion plate 1800 and the light sources 220. In this case, the thickness t10 of the adhesive layer 2000 corresponding to the first concave portion 900 may be greater than the thickness t11 of the adhesive layer 2000 corresponding to the light sources 220.

Figure 23A:
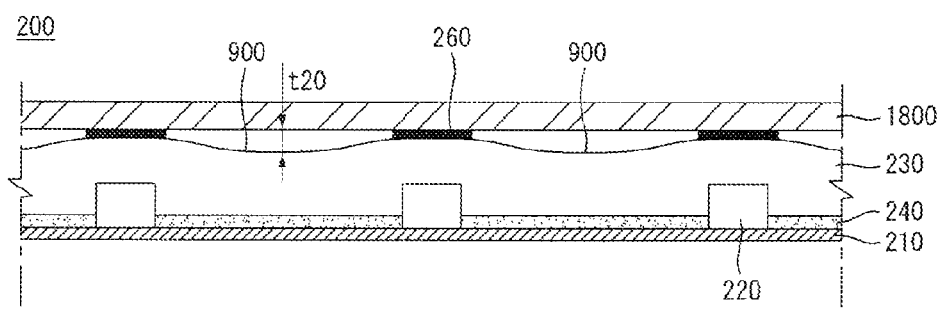

In another example, as shown in FIG. 23A, the diffusion plate 1800 disposed on the resin layer 230 may have predetermined light-shielding parts 260 in a predetermined pattern, which are printed on one side of the diffusion plate 1800. Here, the side of the diffusion plate 1800 on which the light-shielding parts 260 are printed may face the resin layer 230.

Since the diffusion plate 1800 is a hard plate, the diffusion plate 1800 may function as a supporter for supporting other functional layers and diffuse lights emitted from the light sources 220.

The light-shielding parts 260 may be respectively formed on portions of the diffusion plate 1800, which correspond to the light sources 220. The light-shielding parts 260 may prevent or reduce the lights emitted from the light sources 220 from being concentrated on a specific portion.

The light-shielding parts 260 may partially transmit the lights emitted from the light source 220 and partially reflect the lights. To achieve this, the light-shielding parts 260 may be made of TiO2. In this case, the light-shielding parts 260 may be in white, and thus the light-shielding parts 260 can reflect incident light more effectively while partially transmitting the incident light. Other variations of the light-shielding parts 260 are possible.

When the light-shielding parts 260 are printed on the diffusion plate 1800, the diffusion plate 1800 with the light-shielding parts 260 printed thereon may be disposed on the resin layer 230 after the light-shielding parts 260 are printed on the diffusion plate 1800, and thus the process of manufacturing the backlight unit can be simplified and a time required for the manufacturing process can be reduced.

Furthermore, the light-shielding parts 260 may be respectively formed on the portions of the diffusion plate 1800, which correspond to the light sources 220, and thus the first concave portion 900 recessed toward the substrate 210 may be formed in the resin layer 230 between two neighboring light-shielding parts 260.

Accordingly, a gap t20 (air space) between the first concave portion 900 of the resin layer 230 and the diffusion plate 1800 may be sufficiently wide, and thus the optical characteristic of the backlight unit can be further enhanced.

Figure 23B:
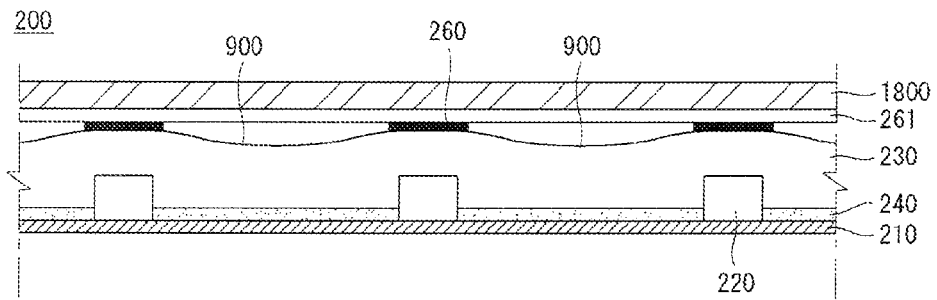

As a variation to FIG. 23A, as shown in FIG. 23B, instead of having the light shielding parts 260 disposed directly on the diffusion plate 1800, the light shielding parts 260 are provided directly on a light shielding layer 261. Then the light shielding layer 261 having the light shielding parts 260 is provided between the diffusion plate 1800 and the resin layer 230. For instance, the light-shielding parts 260 can be printed on the light shielding layer 261 first. The light shielding layer 261 having the parts 260 is then used and formed on the resin layer 230. The diffusion plate 1800 is formed over the light shielding layer 261. The light shielding layer 261 thus further diffuse the light and provides a uniform light emission towards the display panel.

Figure 24:
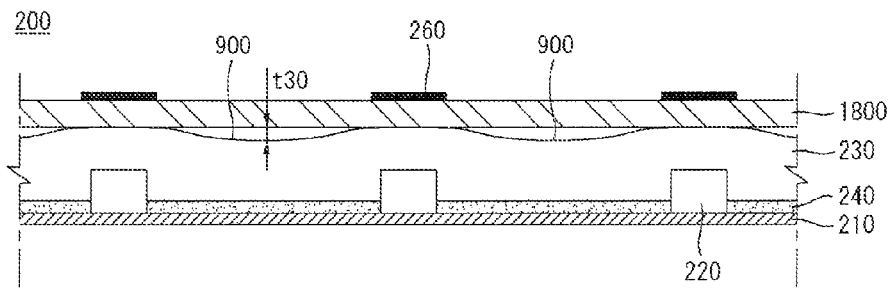

In another example, as shown in FIG. 24, the diffusion plate 1800 with the light-shielding parts 260 printed thereon may be disposed on the resin layer 230 such that the light-shielding parts 260 face a direction opposite to the resin layer 230. That is, if the light-shielding parts 260 are printed on one side of the diffusion plate 1800, the other side of the diffusion plate 1800 may come into contact with the resin layer 230. As a variation, the same concept of having the shielding parts 260 on the diffusion plate 1800 may be applied to the example of FIG. 23B.

The depth of the first concave portion 900 may depend on the distance between two neighboring light sources 220.

Figure 25:
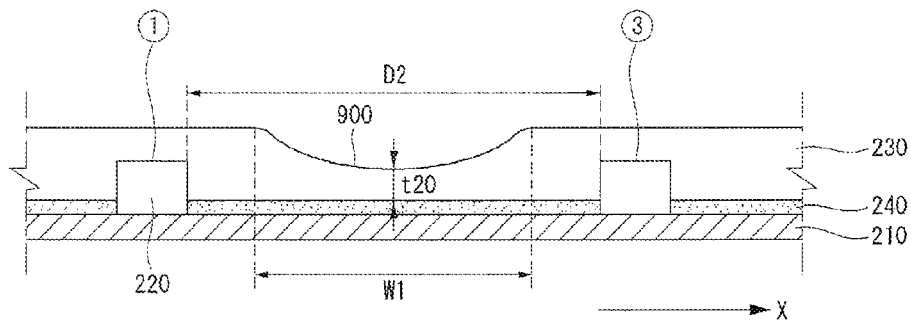
Figure 25:
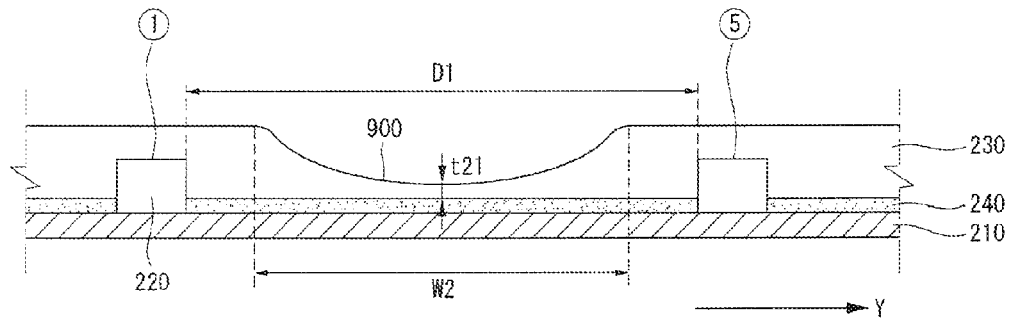
Figure 26:
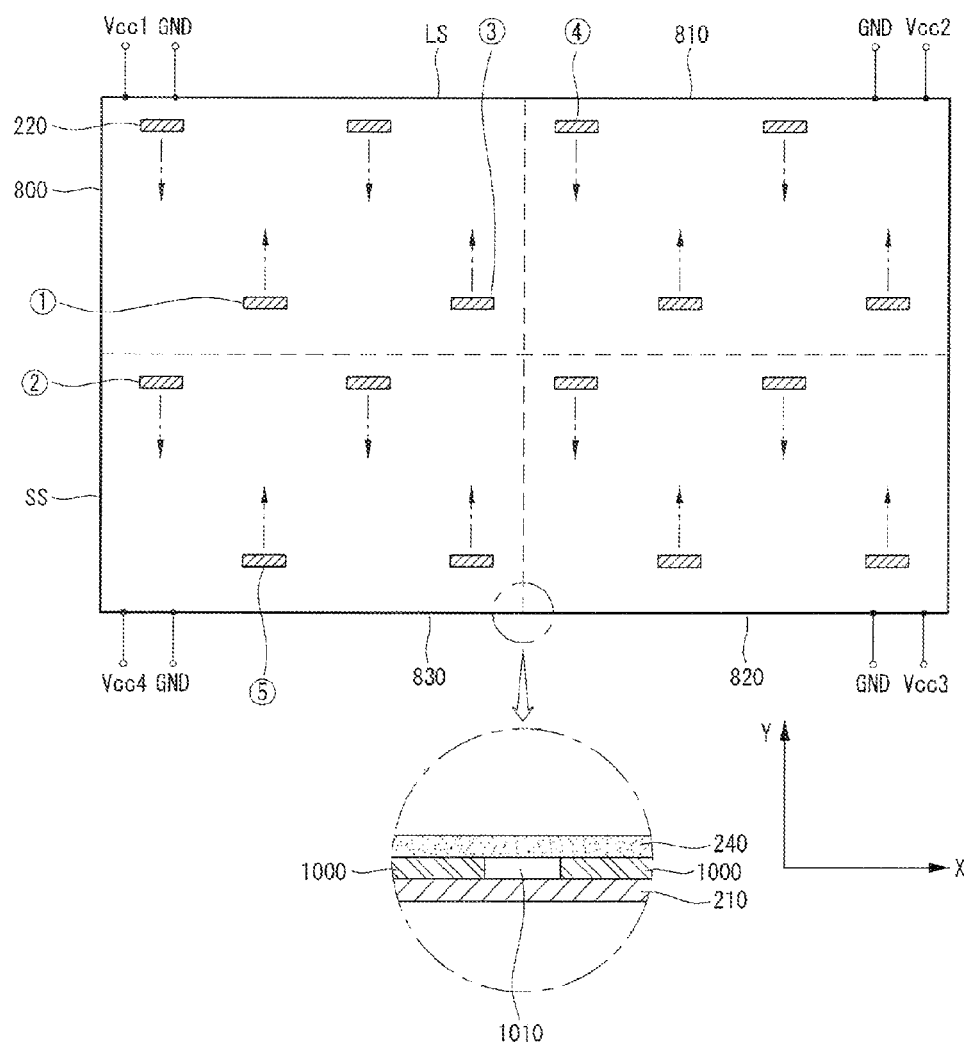
FIGS. 26 through 45 are views for explaining examples of a local dimming method and examples of the resin layer according to an embodiment of the invention.

In the example of FIG. 25, a first light source ① neighbors a third light source in an X-direction and the first light source ① neighbors a fifth light source ⑤ in a Y-direction as shown in an example of FIG. 26. In FIG. 25, the distance D2 between a first light source ① and the third light source ③ may be smaller than the distance D1 between the first light source ① and the fifth light source ⑤.

In this case, the thickness t20 of the first concave portion 900 formed between the first light source ① and the third light source ③, shown in FIG. 25(a), may be greater than the thickness t21 of the first concave portion 900 formed between the first light source ① and the fifth light source ⑤, shown in FIG. 25(b).

Furthermore, the width W1 of the first concave portion 900 formed between the first light source ① and the third light source ③, shown in FIG. 25(a), may be smaller than the width W2 of the first concave portion 900 formed between the first light source ① and the fifth light source ⑤, shown in FIG. 25(b).

FIGS. 26 through 45 are views for explaining a local dimming method and the resin layer according to embodiments of the invention. Detailed explanations of components described above may be omitted.

As shown in FIG. 26, the substrate 210 may include a plurality of blocks 800, 810, 820 and 830. The blocks 800, 810, 820, 830 can also referred to as light generating blocks. Each of the blocks 800, 810, 820 and 830 may include a plurality of light sources 220. That is, the substrate 210 may be divided into the blocks 800, 810, 820 and 830 each having the light sources 220. The light sources 220 in any of the blocks can be any light sources discussed above. The blocks 800, 810, 820 and 830 may be electrically independently driven. As such, when the substrate 210 is segmented into the electrically independent blocks 800, 810, 820 and 830, the local dimming method may be applied to the display device. For instance, each of these blocks can supply light to the corresponding area of the display panel, where such corresponding area can be selectively driven, e.g., display dimmed images or images having different light characteristics, turned on/off, etc.

In the local dimming method, at least one of the blocks 800, 810, 820 and 830 may be selectively turned off. For example, the first, second and third blocks 800, 810 and 820 may be turned on while the fourth block 830 may be turned off. Accordingly, power consumption of the display device can be decreased to improve the driving efficiency of the display device. In addition, a dark image can be further darkened, and thus the contrast of displayed images can be enhanced to improve the quality of the displayed images.

For a local dimming operation, a driving voltage Vcc may be independently supplied to the blocks 800, 810, 820 and 830 and the blocks 800, 810, 820 and 830 may respectively include driving voltage terminals Vcc1, Vcc2, Vcc3 and Vcc4 and ground terminals GND. Since the blocks 800, 810, 820 and 830 can be independently driven, the blocks 800, 810, 820 and 830 may be referred to as unit blocks.

While FIG. 26 shows the four blocks 800, 810, 820 and 830 included in the substrate 210, the number of blocks included in a single substrate may be changed. That is, any number of blocks selectively driven can be provided on the substrate 210. In addition, the blocks 800, 810, 820 and 830 may be arranged in an N×M matrix. Accordingly, the invention allows each of these blocks to be selectively driven, which can include, e.g., turning each block on/off independently of each other, selectively controlling the light emission of each block independently (e.g., selectively dimming/brightening each block independently of the other), etc.

A groove 1010 may be formed between two neighboring blocks to divide the substrate 210 into the blocks 800, 810, 820 and 830. The groove 1010 may be formed by segmenting an electrode 1000 into parts respectively corresponding to the blocks 800, 810, 820 and 830.

Specifically, the electrode 1000 for supplying a driving voltage to the light sources 220 may be formed on the substrate 210 and the reflection layer 240 may be formed on the electrode 1000. The electrode 1000 may be segmented by the groove 1010 into parts respectively corresponding to the blocks 800, 810, 820 and 830. That is, the electrode 1000 is segmented by the groove 1010, and thus the blocks 800, 810 and 820 and 830 can be independently driven. The blocks 800, 810, 820 and 830 are defined by the groove 1010. An adhesive layer may be formed in the groove 1010.

The light sources 220 disposed on the substrate 210 may emit lights in a direction parallel with a short side SS of the substrate 210.

Furthermore, at least one of the light sources 220 disposed on the substrate 210 may emit light in a direction different from the direction in which the remaining light sources emit lights. Light sources 220 emitting lights in different directions may be disposed in each of the blocks 800, 810, 820 and 830. For example, at least one of the light sources 220 may emit light in the first direction (+Y) and at least one of the remaining light sources 220 may emit light in the second direction (−Y) opposite to the first direction, in each of the blocks 800, 810, 820 and 830. The light emitting directions of the light sources 220 are not limited to the directions shown in FIG. 26.

A light source 220 emitting light in the first direction (+Y) and a light source 220 emitting light in the second direction (−Y) may be arranged in proximity to each other in the X-axis direction. For example, two light sources 220 respectively emitting lights in different directions may be arranged in proximity to each other in a diagonal direction based on the light emitting directions of the light sources 220, as shown in FIG. 26. In FIG. 26, the light emitting directions of the light sources 220 are represented by arrows. Here, the light emitting directions may correspond to the light-emitting surface of the light sources 220.

The light sources 220 may be arranged in two or more rows and two or more light sources 220 arranged in the same row may emit lights in the same direction.

As shown in FIG. 26, the first light source ① and the third light source ③ among the light sources arranged in the first block 800 may emit lights in the same direction (+Y). In addition, light sources 220 other than the first light source ① and the third light source ③ among the light sources arranged in the first block 800 may emit lights in a direction opposite to the light emitting direction of the first light source ① and the third light source ③.

The fourth light source ④ of the second block 810 and the second light source ② of the fourth block 830 may emit lights in the same direction which may be opposite to the light emitting direction of the first light source ① and the third light source ③ of the first block 800.

The first light source ① and the third light source ③ may be arranged in proximity to each other in a direction perpendicular to the light emitting direction thereof and the second light source ② may be arranged in proximity to the first light source ① in a diagonal direction on the basis of the light emitting directions of the first and second light sources ② and ②. Furthermore, the fourth light source ④ and the third light source ③ may be arranged in proximity to each other in a diagonal direction on the basis of the light emitting directions of the third and fourth light sources ③ and ④. Here; the first and second light sources ① and ② may emit lights to directions in which the lights become distant from each other whereas the third and fourth light sources ③ and ④ may emit lights towards each other.

As described above, lights can be prevented from being concentrated on a specific portion or from being weakened in a specific portion to achieve uniform brightness if two neighboring light sources 220 have light emitting directions different from each other. As such, generation of hot spots can be prevented.

Figure 27:
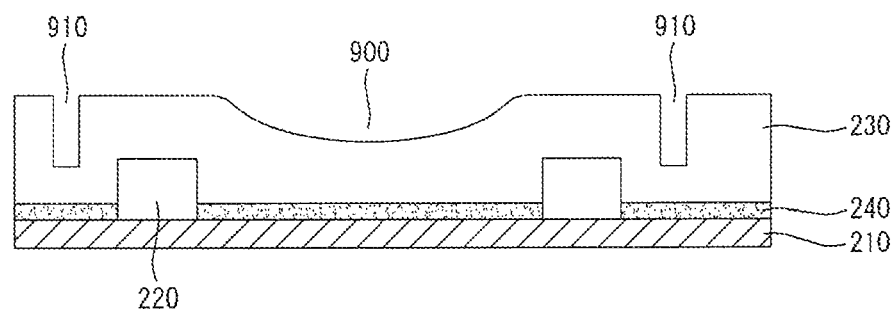
Figure 28:
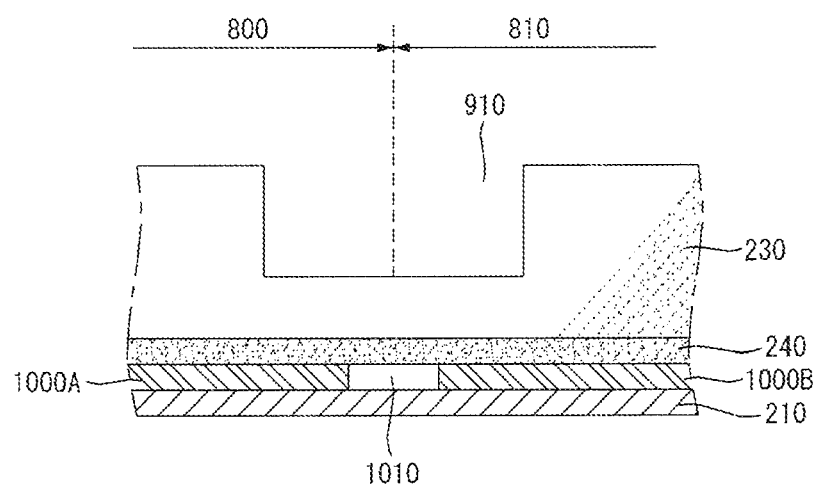

As shown in FIG. 27, the second concave portion 910 recessed towards the substrate 210 may be formed in the resin layer 230. The second concave portion 910 may be arranged between two neighboring blocks, as shown in FIG. 28. For instance, the second concave portion 910 is formed in the resin layer 230 at the boundary of two neighboring blocks (e.g., blocks 800 and 810). The resin layer 230 may also include the first concave portion 900, which has been described above.

As shown in FIG. 28, the second concave portion 910 may be formed in a portion of the resin layer 230, which corresponds to the groove 1010 formed between electrodes 1000A and 1000B respectively arranged in the first and second blocks 800 and 810 among the light generating blocks arranged on the substrate 210. Accordingly, the second concave portion 910 may be overlapped with the groove 1010.

When the second concave portion 910 is formed in the resin layer 230 between the neighboring blocks, the contrast of a displayed image can be improved during the local dimming operation, and thus the quality of the displayed image can be enhanced.

Figure 29:
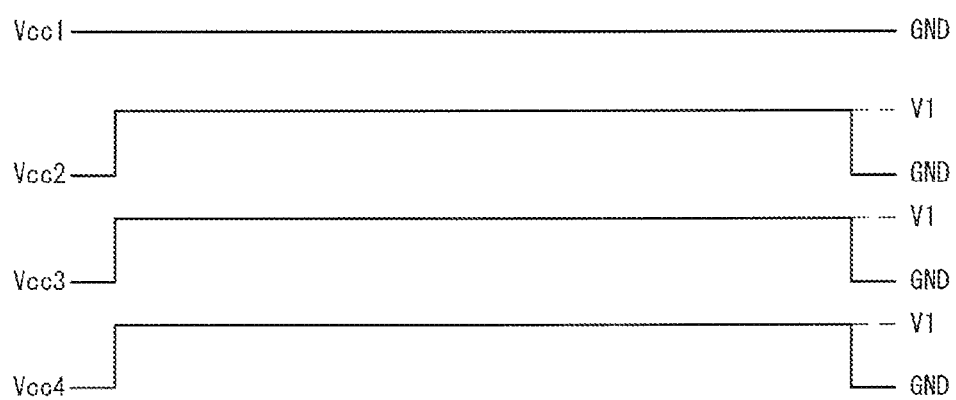

FIG. 29 illustrates exemplary driving signals for local dimming which can be applied in the invention. For example, if the substrate 210 is segmented into the first, second, third and fourth blocks 800, 810, 820 and 830, as shown in FIG. 26, the first block 800 is selectively turned off while the second, third and fourth blocks 810, 820 and 830 are turned on, then the driving voltage Vcc1 supplied to the first block 800 may be cut off and the driving voltages Vcc2, Vcc3 and Vcc4 may be respectively supplied to the second, third and fourth blocks 810, 820 and 830. Although FIG. 29 shows that a first voltage V1 is provided as the driving voltages Vcc2, Vcc3 and Vcc4 to all the second, third and fourth blocks 810, 820 and 830, the driving voltage supplied to at least one of the blocks may be different from the driving voltage supplied to the other blocks.

In this case, the light sources 220 arranged in the second, third and fourth blocks 810, 820 and 830 are turned on to emit lights while the light sources 220 arranged in the first block is turned off and does not emit light. Accordingly, an image is displayed on a region of the display panel, which corresponds to the second, third and fourth blocks 810, 820 and 830 of the backlight unit, whereas images are not displayed at all on a region of the display panel, which corresponds to the first block 800.

When the driving method using the driving signals shown in FIG. 29 is applied to the display device while the second concave portion 910 is formed in the resin layer 230, light emitted from a specific light source 220 and arrived at the second concave portion 910 may be reflected by the second concave portion 910. For example, light generated from the light source 220 arranged in the second block 810 and transmitted to the first block 800 may be blocked by the second concave portion 910 formed at the boundary of the first block 800 and the second block 810.

Figure 30:
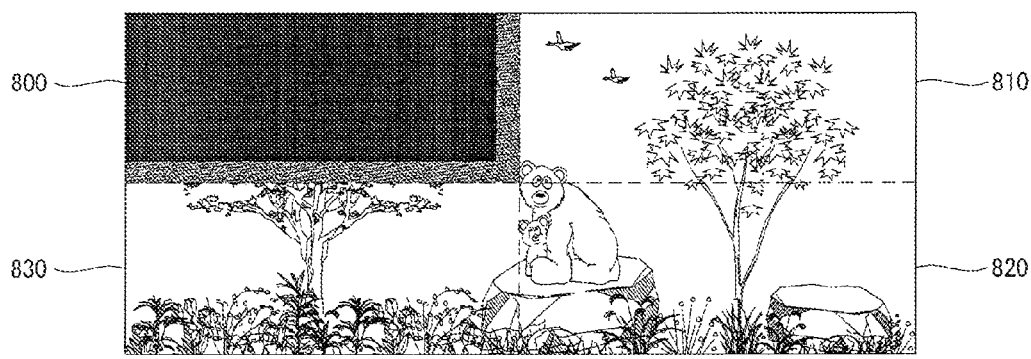
Figure 32:
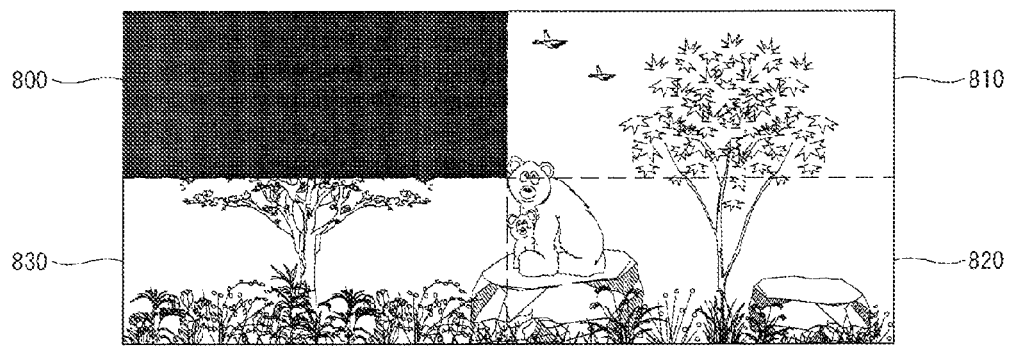

Accordingly, the brightness of a region of the display panel, which corresponds to the first block 800 of the backlight unit, shown in FIG. 32, may be lower than the brightness of the corresponding region shown in FIG. 30. For example, the brightness of the region of the display panel, which corresponds to the first block 800, may be zero in the case of FIG. 32. Accordingly, it is possible to improve the contrast of the displayed image and enhance the quality of the displayed image while increasing the driving efficiency according to local dimming.

Figure 31:
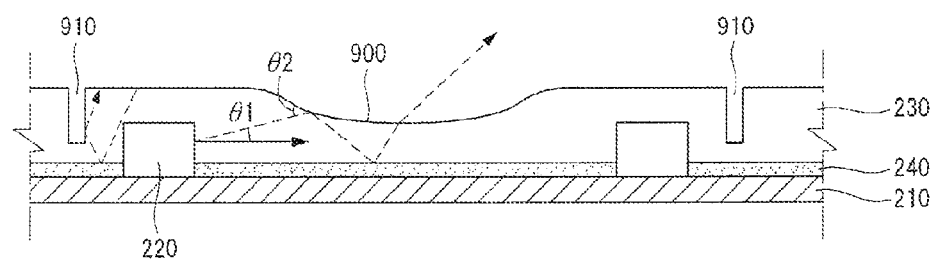

The first concave portion 900 formed in the resin layer 230 may change the direction of light emitted from a specific light source 220 and transmitted at a specific angle θ such that the direction of the light becomes close to a direction perpendicular to the resin layer 230, as shown in FIG. 31.

Accordingly, if both the first concave portion 900 and the second concave portion 910 are formed in the resin layer 230, crosstalk during the local dimming operation can be further reduced and the optical characteristic can be improved.

Figure 33:
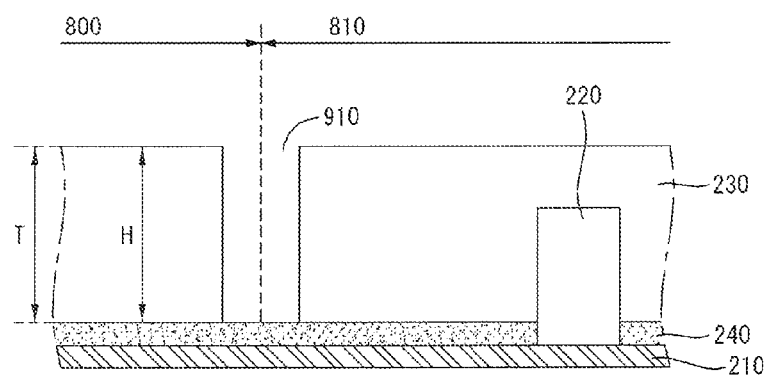

The width of the second concave portion 910 may be smaller than the height of the second concave portion 910, as shown in FIG. 31, to effectively restrain lights from entering neighboring blocks during the local dimming operation. As shown in FIG. 33, the second concave portion 910 formed in the resin layer 230 may be extended to the reflection layer 240. In this case, a portion of the resin layer 230 on the reflection layer 240, which corresponds to the second concave portion 910, may be selectively removed such that the height H of the second concave portion 910 may be substantially equal to the thickness T of the resin layer 230.

Figure 34:
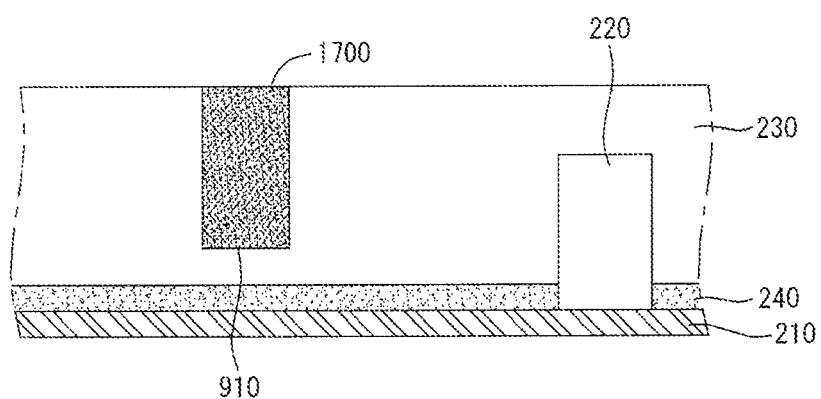

As shown in FIG. 34, a predetermined material 1700 may be filled in the second concave portion 910. Light transmitted in the resin layer 230 and arrived at the second concave portion 910 may be reflected to effectively restrain lights from entering the neighboring blocks during the local dimming operation. In this case, the refractive index of the material 1700 filled in the second concave portion 910 may be lower than that of the resin layer 230. When the predetermined material 1700 is filled in the second concave portion 910, the shape of the second concave portion 910 can be maintained and a damage to the second concave portion 910 can be minimized so as to improve the structural reliability of the backlight unit. The material 1700 filled in the second concave portion 910 may have adhesiveness to improve the adhesive strength of the resin layer 230 and another functional layer.

Figure 35:
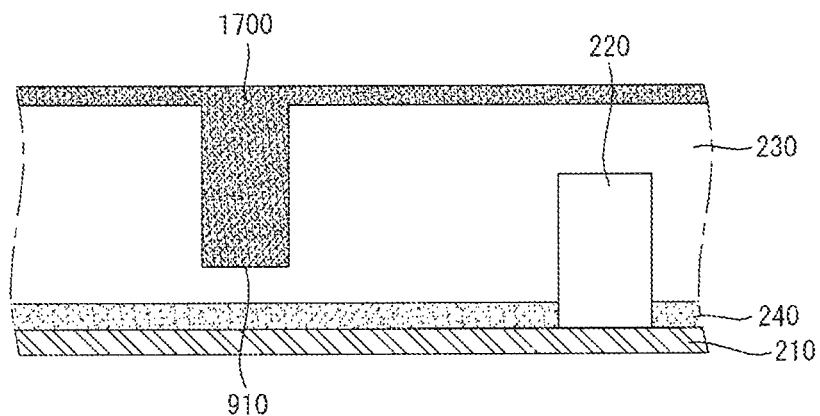

As shown in FIG. 35, the predetermined material 1700 may be coated in the second concave portion 910 and on the surface of the resin layer 230. In this case, the adhesive strength of the resin layer 230 and another functional layer can be improved.

Figure 36:
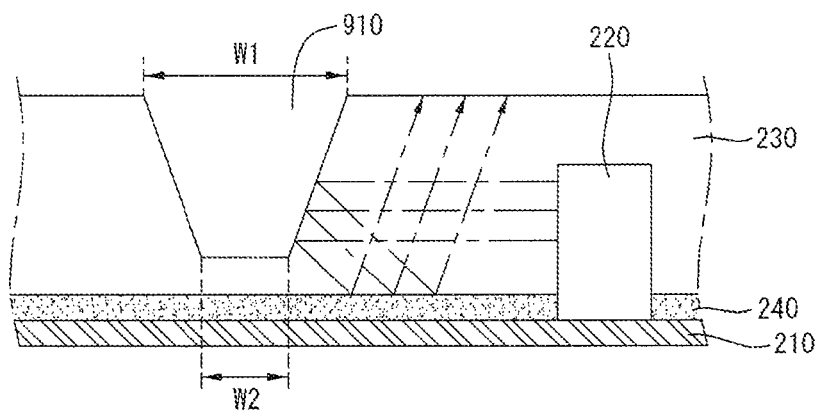

As shown in FIG. 36, the top width W1 of the second concave portion 910 may be greater than the bottom width W2 thereof. In this case, even light traveling from a specific light source 220 to the second concave portion 910 in the vertical direction may be reflected to the reflection layer 240. Accordingly, it is possible to reduce lights entering neighboring blocks more effectively during the local dimming operation. The second concave portion 910 may include a portion having a width that gradually decreases as the width becomes close to the substrate 210, as shown in FIG. 36.

Figure 37:
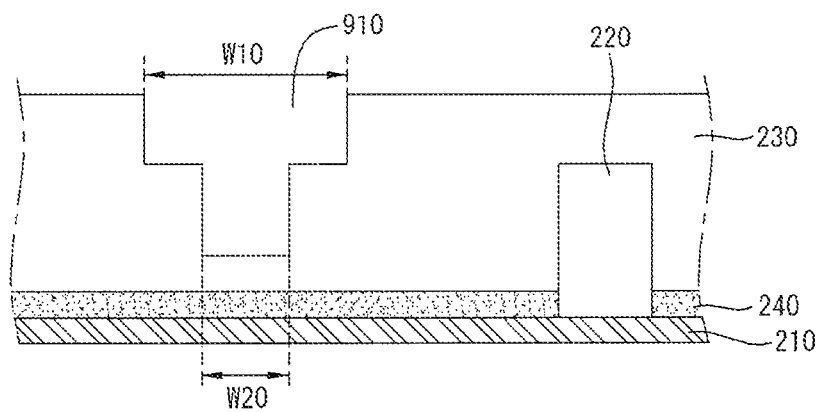

As shown in FIG. 37, the top width W10 of the second concave portion 910 may be greater than the bottom width W20 thereof and include a portion having a width that decreases stepwise as the width becomes close to the substrate 210.

Figure 38:
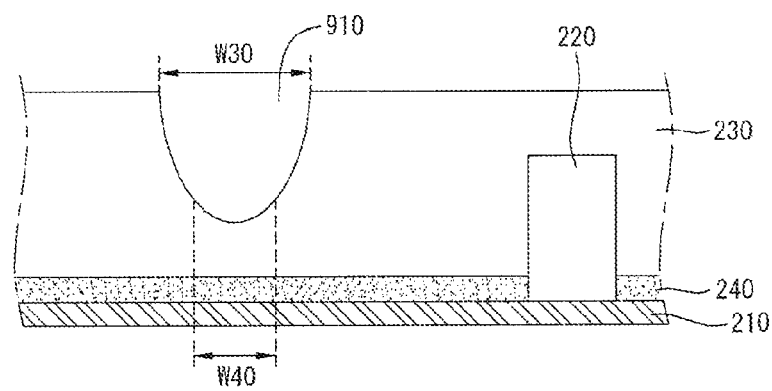

As shown in FIG. 38, the top width W30 of the second concave portion 910 may be greater than the bottom width W40 thereof and the cross section of the second concave portion 910 may have a curved shape.

Figure 39:
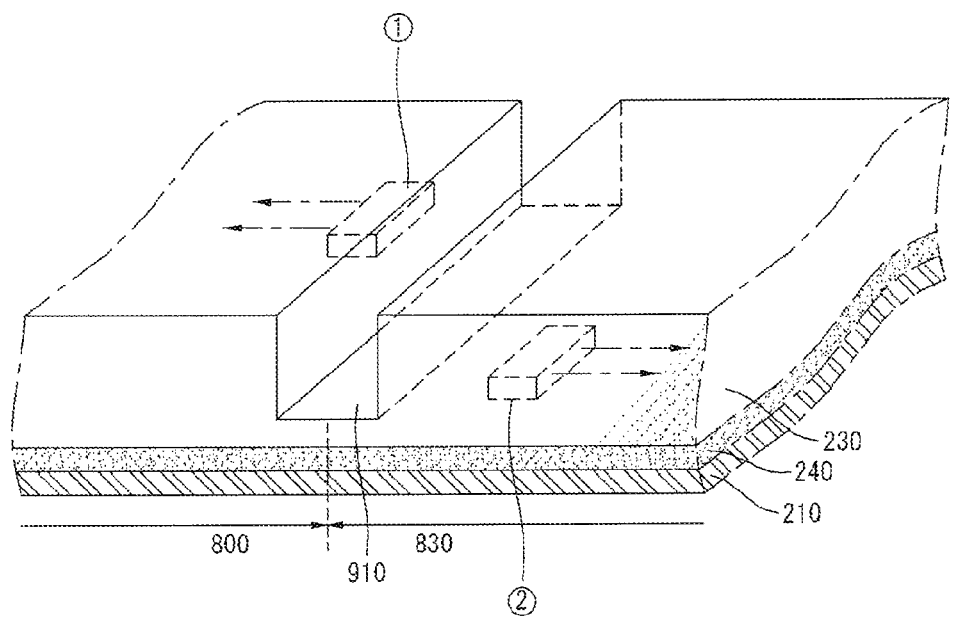

As shown in FIG. 39, the second concave portion 910 may be formed in the resin layer 230 between two neighboring light sources 220 that respectively emit lights in opposite directions. FIG. 39 is a perspective view of a region including the boundary of the first block 800 and the fourth block 830, viewed at the left side of the substrate 210 shown in FIG. 26.

As shown in FIG. 39, the second light source located in the fourth block 830 may emit light to a direction in which the light becomes distant from the first block 800 and the first light source ① may emit light to a direction in which the light becomes distant from the fourth block 830. Furthermore, the second light source ② and the first light source ① may be arranged in proximity to each other in a diagonal direction on the basis of the light emitting directions.

As described above, the second concave portion 910 may be formed in the resin layer 230 between the first light source ① and the second light source ② which respectively emit lights in different directions.

Figure 40:
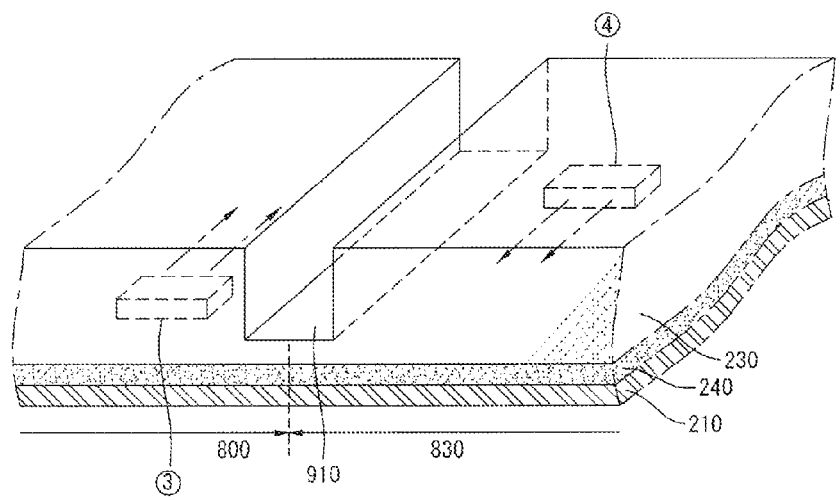

As shown in FIG. 40, the second concave portion 910 may be formed in the resin layer 230 between two neighboring light sources 220 that respectively emit lights in opposite directions or substantially opposite/different direction. FIG. 40 is a perspective view of a region including the boundary of the first block 800 and the second block 810, viewed at the bottom of the substrate 210 shown in FIG. 26. In FIG. 40, the first block 800 is located at the left side and the second block 810 is arranged at the right side.

As shown in FIG. 40, the fourth light source ④ located in the second block 810 and the third light source ③ located in the first block 800 may be arranged in proximity to each other in a diagonal direction on the basis of the light emitting directions of the third and fourth light sources ③ and ④ and the third and fourth light sources ③ and ④ may emit lights to each other.

As described above, the second concave portion 910 may be formed in the resin layer 230 between the third and fourth light sources ③ and ④ which respectively emit lights in opposite directions.

Figure 41:
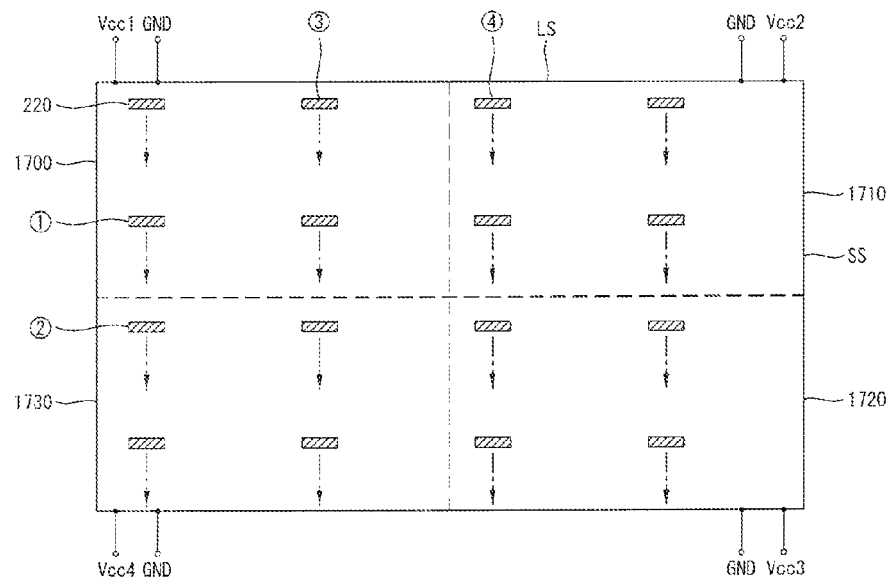

As shown in FIG. 41, the light sources 220 arranged on the substrate 210 may emit lights in the same direction or substantially the same direction. For example, light sources 220 included in each of blocks 1700, 1710, 1720 and 1730 (light generating blocks) may emit lights in the same direction. The light sources 220 here can have any configuration of the light source discussed above.

For example, the first light source ① disposed in proximity to the fourth block 1730 among the light sources arranged in the first block 1700 may emit light toward the fourth block 1730 and the second light source ② located in proximity to the first block 1700 among the light sources 220 arranged in the fourth block 1730 may emit light to a direction in which the light becomes distant from the first block 1700. Here, the first block 1700 and the fourth block 1730 may be arranged in parallel with each other in the light emitting direction of the light sources 220 included in the first block 1700 and the fourth block 1730.

The third light source ③ disposed in proximity to the second block 1710 among the light sources 220 arranged in the first block 1700 and the fourth light source ④ located in proximity to the first block 1700 among the light sources 220 arranged in the second block 1710 may emit lights in the same direction. Here, the first block 1700 and the second block 1710 may be arranged in parallel with each other in a direction perpendicular (substantially perpendicular) to the light emitting direction of the light sources 220 included in the first block 1700 and the second block 1710.

Figure 42:
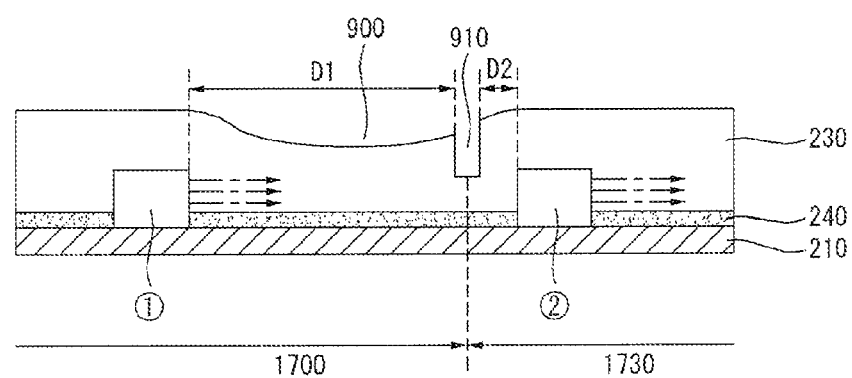

As shown in FIG. 42, the second concave portion 910 may be formed in the resin layer 230 between neighboring two light sources 220 that emit lights in a generally same direction. FIG. 42 is a cross-sectional view of a region including the boundary of the first block 1700 and the fourth block 1730, viewed at the left side of the substrate 210 shown in FIG. 41.

As shown in FIG. 42, the second light source ② located in the fourth block 1730 may emit light to a direction in which the light becomes distant from the first light source ① and the first light source ① may emit light toward the second light source ②. The second light source ② and the first light source ① may be arranged in parallel with each other in the light emitting direction of the first and second light sources ① and ②.

As described above, the second concave portion 910 may be formed in the resin layer 230 between the first and second light sources ① and ② that emit lights in the same direction.

The distance D1 between the first light source ① and the second concave portion 910 may be different from the distance D2 between the second light source ② and the second concave portion 910. The distance D1 between the first light source ① and the second concave portion 910 may be greater than the distance D2 between the second light source ② and the second concave portion 910. In this case, even when the first light source ① emits light toward the second concave portion 910, light generated from the first light source ① of the first block 1700 can be sufficiently restrained from entering the fourth block 1730 during the local dimming operation because the distance D1 between the first light source ① and the second concave portion 910 is sufficiently large.

As shown in FIG. 42, the first concave portion 900 may be arranged between the first light source ① and the second concave portion 910. In this case, light emitted from the first light source ① may be partially scattered by the first concave portion 900 before arriving at the second concave portion 910, and thus crosstalk during the local dimming operation can be further reduced.

Figure 43:
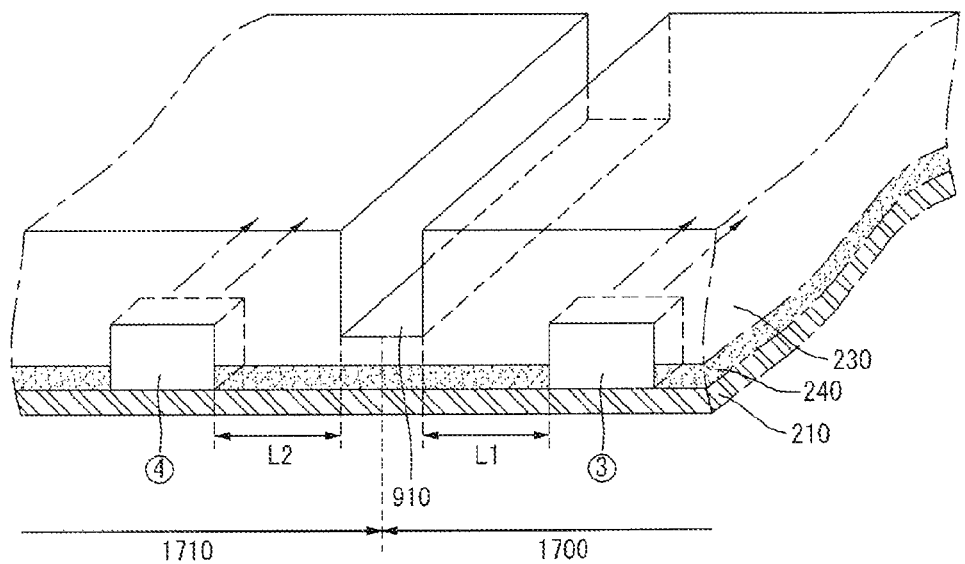

As shown in FIG. 43, the second concave portion 910 may be formed in the resin layer 230 between two light sources 220 that emit lights in the same direction or substantially the same direction and are arranged in proximity to each other in a direction perpendicular (substantially perpendicular) to the light emitting direction thereof. FIG. 43 is a perspective view of a region including the boundary of the first block 1700 and the second block 1710, viewed at the top side of the substrate 210 shown in FIG. 41. In FIG. 43, the first block 1700 is located at the right side and the second block 1710 is disposed at the left side.

As shown in FIG. 43, the fourth light source ④ located in the second block 810 and the third light source ③ located in the first block 800 may emit lights in the same direction and be arranged in parallel with each other in a direction perpendicular to the light emitting direction thereof.

As described above, the second concave portion 910 may be formed in the resin layer 230 between the fourth light source ④ and the third light source ③ that emit lights in the same direction and are arranged in parallel with each other in the direction perpendicular to the light emitting direction thereof.

The distance L2 between the fourth light source ④ and the second concave portion 910 may be equal to the distance L1 between the third light source ③ and the second concave portion 910.

Figure 44:
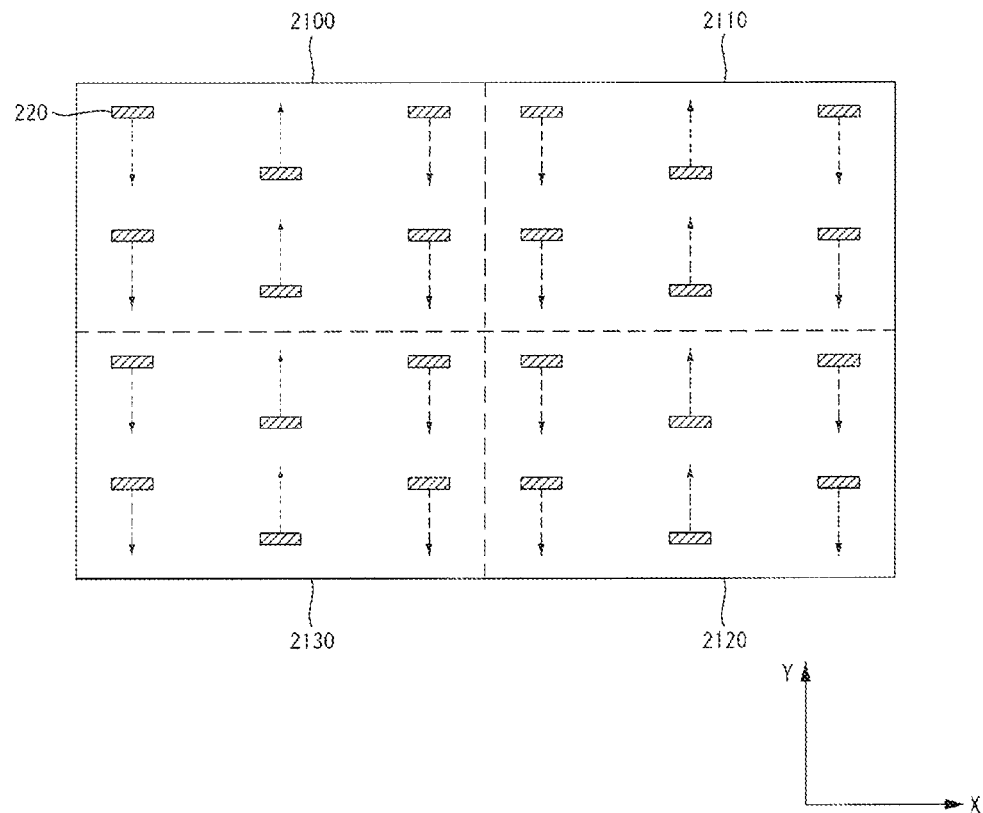

As shown in FIG. 44, the arrangement pattern of the light sources 220 of at least one of blocks 2100, 2110, 2120 and 2130 included in the substrate 210 may be different from that of at least one of the remaining blocks. For example, the arrangement patterns of the light sources 220 of the first block 2100 and the fourth block 2130 may be identical to each other and the arrangement patterns of the light sources 220 of the second block 2110 and the third block 2130 may be identical to each other. Furthermore, the arrangement patterns of the light sources 220 of the first block 2100 and the fourth block 2130 may be different from those of the light sources 220 of the second block 2110 and the third block 2130.

If arbitrary two blocks are arranged in parallel with each other in a first axis direction, the arrangement patterns of light sources of the two blocks may be symmetrical on the basis of the first axis. For example, when light sources 220 arranged on the substrate 210 emit lights in a direction parallel with Y axis, as shown in FIG. 44, the arrangement patterns of the light sources 220 of the first block 2100 and the second block 2110 arranged in parallel with each other in the X-axis direction perpendicular to the Y axis may be different from each other. Here, the arrangement patterns of the light sources 220 of the first block 2100 and the second block 2110 may be symmetrical on the basis of the X axis.

In this case, an odd number of rows of light sources 220 are included in a single block.

A light source 220 disposed in proximity to the fourth block 2130 among the light sources 220 included in the first block 2100 may emit light to a direction in which the light becomes distant from the fourth block 2130 and a light source 220 disposed in proximity to the first block 2100 among the light sources 220 included in the fourth block 2130 may emit light to a direction in which the light becomes distant from the first block 2100.

Even in this case, the second concave portion 910 may be formed in the resin layer 230 between two neighboring blocks. The structure of the second concave portion 910 may be derived from the above description.

Figure 45:
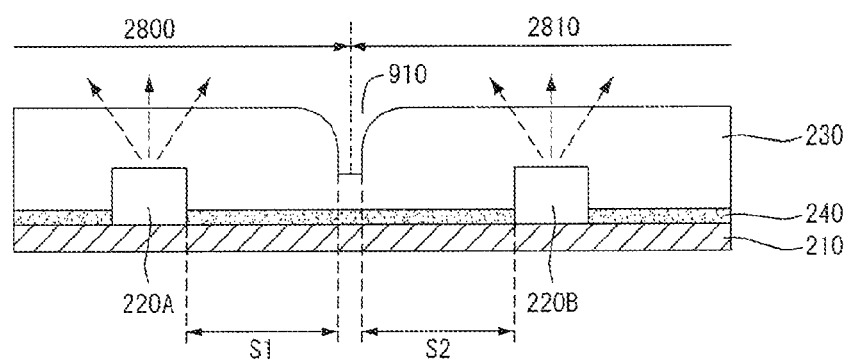

FIG. 45 illustrates top-view type light sources 220A and 220B that emit lights in a direction perpendicular to the plane of the substrate 210 (e.g., in an upwardly direction).

Even in this case, the second concave portion 910 may be formed in the resin layer 230 between two neighboring blocks 2800 and 2810.

The distance S1 between the first light source 220A disposed in the first block 2800 and the second concave portion 910 may be substantially equal to the distance S2 between the second light source 220B disposed in proximity to the first light source 220A and located in the second block 2810 and the second concave portion 910.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light generating device comprising:
    a substrate;
    a plurality of light source devices disposed on the substrate and configured to emit light, at least one of the light source devices including a light emitting diode for generating the light;
    a reflection layer disposed on a surface of the substrate on which the plurality of light source devices are formed, and configured to reflect the light emitted from the light source devices;
    a resin layer covering the light source devices and the reflection layer and configured to propagate the light reflected by the reflection layer, the resin layer including a plurality of depressed portions, at least one of the depressed portions disposed between two adjacent light source devices among the plurality of light source devices; and
    at least one diffusion layer disposed on the resin layer and configured to diffuse the light propagated by the resin layer,
    wherein the substrate is contacted with the plurality of light source devices.

2. The light generating device of claim 1, wherein the diffusion layer contacts portions of the resin layer so that air gaps are provided between the depressed portions of the resin layer and the diffusion layer.

3. The light generating device of claim 1, wherein the at least one diffusion layer includes at least one of a diffusion plate and an optical sheet.

4. The light generating device of claim 1, further comprising:
    a light shielding layer disposed between the resin and diffusion layers and including a plurality of light shielding members corresponding respectively to the plurality of light source devices.

5. The light generating device of claim 1, further comprising:
    a plurality of light shielding members disposed to correspond with the plurality of light source devices.

6. The light generating device of claim 1, further comprising:
    air gaps defined by the depressed portions of the resin layer and the at least one diffusion layer, and configured to diffuse the light propagated from the resin layer.

7. A display device comprising a backlight unit including the light generating device of claim 1.

8. The light generating device of claim 1, wherein bottom surfaces of the plurality of light source devices contact the substrate, and side surfaces of the plurality of light source devices contact the reflection layer.

9. A display device comprising:
    a display panel configured to display images;
    a backlight unit configured to supply light to the display panel, and including a plurality of light generating blocks,
    at least one of the light generating blocks including:
        a substrate,
        a plurality of light source devices disposed on the substrate and configured to emit light, at least one of the light source devices including a light emitting diode for generating the light,
        a reflection layer disposed on a surface of the substrate on which the plurality of light source devices are formed, and configured to reflect the light emitted from the light source devices, a resin layer covering the light source devices and the reflection layer and configured to propagate the light reflected by the reflection layer, the resin layer including a plurality of depressed portions, at least one of the depressed portions disposed between two adjacent light source devices among the plurality of light source devices, and at least one diffusion layer disposed on the resin layer and configured to diffuse the light propagated by the resin layer; and a controller configured to selectively operate the light generating blocks of the backlight unit, wherein the substrate is contacted with the plurality of light source devices.

10. The display device of claim 9, wherein the controller turns on at least one of the light generating blocks while turning off at least another of the light generating blocks.

11. The display device of claim 9, wherein in the at least one of the light generating blocks, the light source devices are arranged in arrays and emit the light laterally in different directions.

12. The display device of claim 11, wherein the different directions are opposite directions.

13. The display device of claim 9, wherein the diffusion layer contacts portions of the resin layer so that air gaps are provided between the depressed portions of the resin layer and the diffusion layer.

14. The display device of claim 9, wherein the at least one diffusion layer includes at least one of a diffusion plate and an optical sheet.

15. The display device of claim 9, the at least one of the light generating blocks further comprising:

a light shielding layer disposed between the resin and diffusion layers and including a plurality of light shielding members corresponding respectively to the plurality of light source devices.

16. The display device of claim 9, the at least one of the light generating blocks further comprising:

a plurality of light shielding members disposed to correspond with the plurality of light source devices.

17. The display device of claim 9, the at least one of the light generating blocks further comprising:

air gaps defined by the depressed portions of the resin layer and the at least one diffusion layer, and configured to diffuse the light propagated from the resin layer.

18. The display device of claim 9, wherein bottom surfaces of the plurality of light source devices contact the substrate, and side surfaces of the plurality of light source devices contact the reflection layer.

* * * * *